(12) United States Patent
Tsubaki et al.

(10) Patent No.: US 6,841,109 B2
(45) Date of Patent: Jan. 11, 2005

(54) SUPPORT FOR IMAGING MATERIAL

(75) Inventors: Masayuki Tsubaki, Tokyo (JP); Touru Noda, Tokyo (JP); Tomoichi Morita, Tokyo (JP); Massashi Kubbota, Tokyo (JP)

(73) Assignee: Mitsubishi Paper Mills Ltd., Tokyo (JP)

( * ) Notice: Subject to any disclaimer, the term of this patent is extended or adjusted under 35 U.S.C. 154(b) by 283 days.

(21) Appl. No.: 10/002,109

(22) Filed: Dec. 5, 2001

(65) Prior Publication Data

US 2002/0064672 A1 May 30, 2002

Related U.S. Application Data

(62) Division of application No. 09/034,139, filed on Feb. 22, 1998, now Pat. No. 6,335,102.

(30) Foreign Application Priority Data

| Feb. 20, 1997 | (JP) | ............................................. | H9-36680 |
| Mar. 18, 1997 | (JP) | ............................................. | H9-64334 |
| Mar. 18, 1997 | (JP) | ............................................. | H9-64336 |
| Jun. 20, 1997 | (JP) | ......................................... | H9-164375 |

(51) Int. Cl.$^7$ ............................................. B29C 47/06
(52) U.S. Cl. ............................. 264/171.18; 264/171.23; 427/411
(58) Field of Search ....................... 264/171.18, 171.17, 264/171.23, 173.1, 172.19, 171.3; 427/326, 361, 411

(56) References Cited

U.S. PATENT DOCUMENTS

| 4,781,793 | A | | 11/1988 | Halme | ......................... | 162/55 |
| 4,966,651 | A | | 10/1990 | Olson et al. | .................. | 162/28 |
| 5,104,722 | A | | 4/1992 | Kojima et al. | .............. | 428/218 |
| 5,126,187 | A | | 6/1992 | Punton et al. | .............. | 428/212 |
| 5,182,161 | A | | 1/1993 | Noda et al. | ................. | 428/195 |
| 5,290,672 | A | | 3/1994 | Dunk | ......................... | 430/538 |
| 5,328,749 | A | | 7/1994 | Noda et al. | ................. | 428/195 |
| 5,457,016 | A | * | 10/1995 | Dethlefs | ..................... | 430/531 |
| 5,633,041 | A | * | 5/1997 | Arrington | ................... | 427/361 |
| 5,824,462 | A | * | 10/1998 | Ashida et al. | ............. | 430/531 |
| 5,824,463 | A | * | 10/1998 | Arrington | ................... | 430/532 |
| 5,888,714 | A | * | 3/1999 | Bourdelais et al. | ......... | 430/536 |
| 6,335,102 | B1 | * | 1/2002 | Tsubaki et al. | ............. | 428/513 |
| 6,503,431 | B1 | * | 1/2003 | Kasai et al. | ........... | 264/171.13 |
| 6,669,885 | B2 | * | 12/2003 | Kasai et al. | ........... | 264/171.13 |

FOREIGN PATENT DOCUMENTS

| JP | 58037642 | 3/1983 |
| JP | 60067940 | 4/1985 |
| JP | 61035442 | 2/1986 |
| JP | 62289698 | 12/1987 |
| JP | 07168308 | 12/1993 |
| JP | 07020604 | 1/1995 |
| JP | 07120868 | 5/1995 |

* cited by examiner

*Primary Examiner*—Mark Eashoo
(74) *Attorney, Agent, or Firm*—Nixon & Vanderhye P.C.

(57) ABSTRACT

A support for an imaging material, which not only can give an imaging material and a print thereon having a high gloss appearance and being free of non-uniformity in gloss but also is improved in the property of peeling from a cooling roll and which has high stiffness and can be stably produced at a high speed, the support being a resin-coated-paper-based support for an imaging material, in which (1) each of a resin sheet on a side (front side) where an image is to be formed and a base paper has a multi-layered structure, (2) the base paper has a multi-layered structure, the resin sheet on the front surface is a polyolefin resin sheet and the paper layer constitution of the base paper is specified, or (3) the front resin sheet has a multi-layered structure constituted of an upper layer containing at least 50% by weight of a polyethylene resin having a density of at least 0.940 g/cm$^3$ and a lower layer containing a largest amount of a polyethylene resin (b) having a density of less than 0.940 g/cm$^3$ among and the base paper is composed mainly of a natural pulp having a specific fiber length.

8 Claims, No Drawings

SUPPORT FOR IMAGING MATERIAL

This application is a division of Ser. No. 09/034,139, filed Feb. 22, 1998, now U.S. Pat. No. 6,335,102.

BACKGROUND OF THE INVENTION

1. Field of the Invention

The present invention relates to a support for an imaging material, more specifically to a support whose surface on one side of a paper substrate composed mainly of a natural pulp where an image-forming layer is to be formed is coated with a resin sheet, which support not only can provide an imaging material and a print thereon having a high visual gloss and being free of non-uniformity in gloss, particularly silver halide photographic paper and a print thereon (silver halide photographic paper print will be sometimes abbreviated as "photographic print" hereinafter), but also is improved in the property of peeling from a cooling roll used when the support is produced so that no non-uniformity in peeling occurs, and further, which support has excellent curl resistance and an excellent stiffness and can be stably produced at a high speed.

2. Explanation of Related Art

Generally, an imaging material is constituted of a support for the imaging material and an image-forming layer provided on the support. For example, a silver halide photographic material, an inkjet recording material, a thermal diffusion transfer type heat transfer record receiving material, a heat-sensitive recording material or a photosensitive-thermosensitive recording material is produced by forming an image-forming layer such as a silver halide photograph constituting layer, an ink receiving layer, a thermal transfer type heat transfer record receiving layer, a heat-sensitive color-forming layer or a photosensitive-thermosensitive color-forming layer on a support for an imaging material, respectively, and optionally forming an undercoat layer, a protective layer, and the like. In particular, a silver halide photograph constituting layer is constituted of a silver halide photograph emulsion layer, a protective layer, an undercoat layer, either an intermediate layer or a color mixing prevention layer, either a halation prevention layer or a filter layer and an ultraviolet absorbent layer, or a combination of some of these. For example, a simple silver halide photographic material is structured by forming a silver halide emulsion layer and its protective layer on a support for a photographic material. Further, a multi-layered silver halide color photographic material is structured by consecutively forming silver halide color photograph constituting layers such as an under coat layer, a blue-sensitive silver halide emulsion layer and an intermediate layer, a green-sensitive silver halide emulsion layer and an ultraviolet absorbent layer, and a speed-sensitive silver halide emulsion layer and a protective layer, and the like on a support for a photographic material.

There is conventionally well known a resin-coated paper support in which the surface of a base paper for a support for an imaging material is coated with a resin having film formability. Concerning a support for a photographic material for use in a silver halide photographic material, for example, there is known a support for a photographic material in which a base paper is coated with a resin having film formability, preferably a polyolefin resin. There is also known a support for a photographic material in which both surfaces of a base paper are coated with a polyolefin resin. Further, after the application of the rapid photographic development treatment method of a silver halide photographic material, a support for a photographic material in which the both surfaces of a base paper are coated with a polyethylene resin is mainly practically used as a photographic paper, and the resin layer on one side where an image-forming layer is formed generally contains a titanium dioxide pigment for imparting sharpness as required.

Further, there is known a thermal transfer record receiving element having, as a support, a resin-coated paper of which the resin coating has a surface roughness of 7.5 microinches-AA or less, particularly, a polyethylene-resin-coated paper of which the base paper is surface-coated with a polyethylene resin. There is also known an inkjet recording sheet having a resin-coated paper as a support.

However, a resin-coated paper type support for an imaging material, i.e., a support which is formed of a base paper, particularly a base paper composed mainly of a natural pulp, and which is surface-coated with a resin layer on a surface side where an image-forming layer is to be formed, still has several serious problems, and actually, no satisfactory achievement has been obtained.

First, in a resin-coated paper for use as a support for an imaging material, a base paper is coated with a resin having at least film formability, particularly a resin layer containing a polyethylene-based resin, on a surface side where an image-forming layer is to be formed (a surface on which an image-forming layer is to be formed will be sometimes abbreviated as a front surface, a resin layer coating on the front surface will be sometimes abbreviated as a front resin layer, a side opposite thereto will be sometimes abbreviated as a reverse side, and a resin layer formed on the reverse surface will be sometimes abbreviated as a reverse resin layer). The above resin-coated paper is obtained by a series of steps of casting onto a running base paper a film of polyethylene resin composition extruded through a slit die of a melting extruder; pressing them in a nip of a pressing roll and a cooling roll to bond them; cooling the resultant laminate; and then peeling it from the roll. In this case, for producing a resin-coated paper for an imaging material for glossy use, there is used a cooling roll which has a mirror surface, a gloss surface or a finely roughened surface and has an excellent smoothness. In this manner, the front resin layer in a molten state is brought into contact with the cooling roll having an excellent smoothness under pressure. Therefore, the front resin layer could be processed so as to have a surface having an excellent smoothness, and an imaging material using the above resin-coated paper as a support and a print thereon-could have a visually high gloss. However, concerning an imaging material using an actually produced resin-coated paper as a support and a print thereon, it has not been possible to obtain any product having a high-gloss appearance. Concerning a photographic paper using a resin-coated paper in particular, it has not been possible to obtain a photographic paper and a print thereon having a sufficiently high-gloss appearance.

The present inventors have therefore made studies for factors of the high-gloss appearance of imaging materials and their prints. As a result, the gloss appearance is affected by various factors such as a resin-coated paper as a support, an image-forming layer and an image-forming method such as development, while it has been found that the gloss appearance is also greatly affected by the factor of a resin-coated paper as a support. The present inventors have therefore made studies on the factor of a resin-coated paper which affects the appearance of gloss. As a result, it has been found that the gloss appearance not only depends upon the factor of a resin layer but also depends upon a variety of factors including factors of the kind and properties of a base paper composed mainly of a natural pulp such as the kind of a natural pulp and a fiber length, conditions of a paper material slurry such as additives for paper, contained in a paper material slurry, paper-making conditions such as a paper-making speed, a bulk density increasing press conditions and machine calender conditions, post-treatment conditions such as size press and tub size press, and further, the surface roughness of a base paper. It has been also found that as the thickness of a front resin layer of a resin-coated paper decreases, the gloss appearance of an imaging material using the above resin-coated paper as a support and a print thereon decreases, and that when the above thickness is 31 μm or less, the above gloss appearance greatly decreases. A photographic material for glossy use is required to give a print having a high gloss appearance, and the problem is that a photographic material which gives a photographic print having a poor gloss appearance is absolutely not suitable for glossy use and has no commercial value.

Second, a resin-coated paper for an imaging material for glossy use is required to have high smoothness. When a base paper is coated with a molten resin by extrusion, however, as the thickness of a front resin layer increases, in particular, when the above thickness is 20 μm or greater or as the speed of production of the resin-coated paper increases, in particular, when the above speed is 200 m/mn or greater, the peeling of the resin-coated paper from a cooling roll is degraded, and a non-uniformity in the form of a lateral height difference in a width direction, called "peel non-uniformity", occurs on the resin-coated paper. When the above peel non-uniformity occurs, an imaging material using the resin-coated paper as a support and a print thereon cause gloss non-uniformity. The problem is that the gloss appearance further deteriorates and that the commercial value thereof extremely decreases.

Conventionally, there are some methods proposed for overcoming the above problems and some other problems of a support of a resin-coated paper type for an imaging material. For example, there is known a method in which crater-shaped pores which are liable to occur in the front resin layer surface of a photographic support of a resin-coated paper type are prevented or overcome by double layer extrusion coating method by means of co-extrusion coating or consecutive extrusion coating, to provide a photographic support which is free of surface defects and is excellent in smoothness. However, the above method is insufficient for overcoming the above-explained problems, and in particular, it is absolutely insufficient for improving the gloss appearance of an imaging material using a resin-coated paper as a support and a print thereon.

On the other hand, for improving a resin-coated paper in smoothness, there are known methods using a specific pulp such as a pulp having a specific fiber length distribution, a pulp having specific fiber length, width and thickness, a specific conifer pulp or a specific low-density pulp, a base paper having a specific physical property value such as a base paper having a Beck smoothness equivalent to, or greater than, a specific value or a base paper having a surface roughness equivalent to, or smaller than, a specific value. For the same purpose, there is known a method of hot calendering of a base paper or there is known a specific paper-making method such as paper-making with a paper machine having an upper dehydration mechanism, paper-making with a Fourdrinier two-layer paper machine or the bulk density increasing press of a wet paper. However, these methods are still insufficient for overcoming the above problems, and in particular, they are absolutely insufficient for improving the gloss appearance of an image material using a resin-coated paper as a support and a print thereon.

Meanwhile, the most simplest method for improving the smoothness of a resin-coated paper for glossy use is, generally, to increase the thickness of the front resin layer. However, as the thickness of the front resin layer is increased, particularly, when the above thickness is greater than 31 μm, there is caused a problem that a resin-coated paper, an imaging material using the resin-coated paper as a support and its print curl toward an image-forming layer side and are much troublesome to handle, i.e., a problem that the curl resistance is degraded.

Further, a resin-coated paper is improved in smoothness by using a base paper having excellent smoothness as a base paper for the resin-coated paper. However, there is often involved a problem that an imaging material using the above resin-coated paper as a support and its print have a poor stiffness. When an imaging material, a photographic material in particular, has a poor stiffness, there is sometimes caused a problem that the developability, automatic developability in particular, is degraded. Further, a print is manually taken up for its appreciation, and a "panorama" having a large width has a problem that it is difficult to appreciate when it has a poor stiffness. An imaging material and its print are therefore required to have a strong stiffness, while, as a result of studies by the present inventors, it has been found that the stiffness of an imaging material and its print greatly depends upon the strength of stiffness of a resin-coated paper as a support and that the stiffness of the resin-coated paper greatly depends upon the strength of stiffness of a base paper. However, the problem of stiffness of a base paper often has a contradicting relationship with the smoothness of the base paper, and the following inconsistent problems have been found. When the smoothness is good, the stiffness is poor. When the stiffness is sufficient, the smoothness is poor, and as a consequence, the stiffness of an imaging material using the resin-coated paper as a support and its print is poor, or the gloss appearance of the print, a photographic print in particular, is poor.

There are some methods conventionally proposed for overcoming the above problems of a support for an imaging material of a resin-coated paper type. JP-A-61-132949 discloses a method for providing a photographic support of a resin-coated paper type having a high rigidity and a high gloss by a photographic base paper formed of a first coating film composed mainly of a low-density polyethylene and a second coating layer composed of a polymer having a high rigidity modulus. As a polymer having a higher rigidity modulus, the above publication discloses high-density polyethylene (HDPE), polypropylene (PP), polycarbonate (PC), linear low-density polyethylene (LLDPE), polyamides such as nylon 11, nylon 6 and nylon 66, and polyesters such as polyethylene terephthalate (PET) and polybutylene terephthalate (PBT). However, the use of the above method is still insufficient for improving the gloss appearance of an imaging material using a resin-coated paper as a support and a print thereon, and there occurs a problem that the curl resistance is degraded. That is, the following problem occurs. When a polymer having a high density is used as a polymer in the second coating layer, and in particular, with an increase in the above density or with an increase in the content of the above polymer in the coating layer, a resin-coated paper, an imaging material using the resin-coated paper as a support and its print show poor curl resistance.

Further, JP-A-7-120868 discloses a method in which at least two water-resistant-resin-coated layers are formed and a water-resistant resin of a layer farthest from a base paper has a higher density than a water-resistant resin of any other layer(s), and JP-A-7-168308 discloses a method in which at least two water-resistant-resin-coated layers are formed and a resin having a specific flexural modulus is used as a water-resistant resin for an outer-most layer, for improving the adhesion between a base paper and the water-resistant resin layers and the property of peeling from a cooling roll, to provide a support for a photographic paper of a resin-coated paper type. However, the above methods are still insufficient for improving the gloss appearance of an imaging material using a resin-coated paper as a support and of a print thereon. Further, there occurs another problem that the resin-coated paper and an imaging material using the resin-coated paper as a support are degraded in curl resistance. That is, the following problem occurs. When a water-resistant resin having a high density is used as a water-resistant resin in a coating layer, and in particular, with an increase in the above density or with an increase in the content of the above water-resistant resin in the coating layer, a resin-coated paper, an imaging material using the resin-coated paper as a support and its print show poor curl resistance.

DISCLOSURE OF THE INVENTION

Under the circumstances, it is therefore an object of the present invention to provide a support for an imaging material, which support is formed of a paper substrate composed mainly of a natural pulp and a resin layer coated on the front surface of the paper substrate, which can give an imaging material and its print having a high gloss appearance and being free of gloss non-uniformity, and which is excellent in productivity and economic performance in that the support is improved in its peeling from a cooling roll used for its production so as not to cause any non-uniformity in gloss, that the curl resistance thereof is improved, that the support has strong stiffness and that the support can be stably produced at a high speed.

The present inventors have therefore made diligent studies to develop a support for an imaging material which support has the above desirable properties, and as a result, have found the following. A resin-coated-paper-based support for an imaging material, in which a resin sheet on a side where an image is to be formed and a base paper have a multi-layered structure each or a resin-coated-paper-based support for an imaging material in which a base paper has a multi-layered structure of a layer structure having a specific thickness and containing a broad-leaved tree pulp having a specific fiber length and a resin sheet on a side where an image is to be formed is a polyolefin resin sheet, can give an imaging material and a print having a high gloss appearance and being free of gloss non-uniformity, is improved in the property of peeling from a cooling roll so that no peel non-uniformity takes place, and can be stably produced at a high speed.

Further, it has been found that a support in which a resin sheet on a side where an image is to be formed has a multi-layered structure, a top layer thereof contains a specific amount of a polyethylene-based resin having a density equivalent to, or higher than, a specific value and has a specific thickness, a bottom layer thereof contains a polyethylene-based resin having a density less than a specific value, the content of the polyethylene-based resin being the largest in the bottom layer, and a paper substrate is composed mainly of a natural pulp having a specific fiber length, can give an imaging material and a print having a high gloss appearance, excellent curl resistance and a strong stiffness, and can be stably produced at a high speed.

The present invention has been made on the basis of the above findings.

That is, according to the present invention, there is provided a resin-coated-paper-based support for an imaging material which support comprises a base paper and a sheet of a resin having film formability coated at least on a side of the base paper where an image is to be formed, characterized in that the resin sheet on the side where an image is to be formed and the base paper have a multi-layered structure each (the above support for an imaging material will be sometimes referred to as "support I for an imaging material" hereinafter).

According to the present invention, further, there is provided a resin-coated-paper-based support for an imaging material which support comprises a base paper and a sheet of a resin having film formability coated at least on a side where an image is to be formed, characterized in that the base paper has a multi-layered structure, a paper layer adjacent to the polyolefin resin sheet on the side where an image is to be formed has a thickness equivalent to 10 to 40% of a thickness of the base paper as a whole and is composed of a broad-leaved tree craft pulp beaten to an average fiber length of 0.3 to 0.5 mm, and that, of the other layers of the base paper, a layer composed of a pulp composition which is beaten to an average fiber length of 0.5 to 0.8 mm and contains at least 80% by weight of a broad-leaved tree craft pulp has a total thickness equivalent to, or greater than, 60% of the thickness of the base paper as a whole (the above support for an imaging material will be sometimes referred to as "support I for an imaging material", hereinafter).

Further, according to the present invention, there is provided a support for an image material, which is formed of a paper composed mainly of a natural pulp, as a substrate, and a multi-layered resin sheet coated on a surface of the paper substrate where an image-forming layer is to be formed, characterized in that an upper layer (surface layer) A in the multi-layered sheet contains at least 50% by weight of a polyethylene-based resin (a) having a density of at least 0.940 g/cm$^3$ and has a thickness equivalent to, or smaller than, 50% of a thickness of the multi-layered resin sheet, that a lower layer (or each of lower layers present below the surface layer) B contains a largest amount of a polyethylene-based resin (b) having a density of less than 0.940 g/cm$^3$ among polyethylene-based resins in the layer(s) B, and that the paper substrate is composed mainly of a natural pulp having an average fiber length of 0.45 to 0.65 mm (the above support for an imaging material will be sometimes referred to as "support III for an imaging material" hereinafter).

In the present invention, the "average fiber length" of pulp refers to a length weighted mean fiber length (mm) obtained by measuring a beaten pulp according to JAPAN TAPPI Paper Pulp Testing Method No. 52-89, "Method of testing paper and pulp for fiber length".

PREFERRED EMBODIMENTS OF THE INVENTION

In the support I for an imaging material, provided by the present invention, the base paper and the resin sheet on a side where an image is to be formed (front side) have a multi-layered structure each. In the support II for an imaging material, the resin sheet on the front side is a polyolefin resin sheet, the base paper has a multi-layered structure, and the layer structure is specifically constituted.

In the support I for an imaging material, provided by the present invention, it is not clear why the mere formation of the base paper and the resin sheet as multi-layered structures improves the gloss appearance. However, it is assumed that the following statistical properties work. When each of the base paper and the resin sheet is increased in thickness as a single layer, the fluctuation of the thickness increases with an increase in thickness, while the division of a layer into layers relatively lessens an increase in the fluctuation due to a phase deviation of the fluctuation and a difference in frequency. It is also assumed that a combination of the base paper and the resin sheet produces an effect not only for the above reason but also because the size of concave and convex shapes on a surface comes into the acute region of human eyes.

In the support I for an imaging material (to be sometimes simply referred to as "support I" hereinafter) and the support II for an imaging material (to be sometimes simply referred to as "support II" hereinafter) provided by the present invention, the multi-layered base paper can be formed by any one of a method in which a multi-layer-structured head box is used, a method in which pulp slurries for upper layers are consecutively fed onto a pulp slurry for a lower layer in the step of dehydration on a wire and a method in which layers made in the form of sheets with a Fourdrinier paper machine or a cylinder paper machine are combined. In view of an interlayer bonding strength, however, it is preferred to form the multi-layered base paper at an early stage of paper making.

In the support I of the present invention, a paper layer adjacent to the front resin sheet has a thickness, preferably, of at least 10 µm, more preferably at least 30 µm, particularly preferably at least 50 µm and is composed of a natural pulp beaten to an average fiber length of 0.3 to 0.5 mm. In this case, a further favorable result can be produced. The pulp which forms layer(s) other than the above layer adjacent to the front resin sheet is preferably that which is beaten to an average fiber length in the range of from 0.5 to 0.8 mm. When the fiber length of the pulp in any one of the layer adjacent to the front resin sheet and the other layer(s) is too small, the internal bonding strength of the base paper may decrease or the stiffness thereof may decrease. When the pulp fiber length of the layer adjacent to the front resin sheet is too large and equivalent to the length of the pulp fiber length of the other layer(s), the effect of the present invention is limitative. On the other hand, when the pulp fiber length of the layers as a whole is too large, the practical commercial value of the support I decreases although the effect of the present invention is exhibited as compared with a case where the present invention is not practiced.

On the other hand, in the support II of the present invention, the paper layer adjacent to the polyolefin resin sheet on the front side has a thickness equivalent to 10 to 40%, preferably 20 to 30%, of the thickness of the base paper as a whole, and is composed of a broad-leaved tree craft pulp beaten to an average fiber length of 0.3 to 0.5 mm. Further, of the other layers of the base sheet, the layer composed of a pulp composition which is beaten to an average fiber length of 0.5 to 0.8 mm and contains at least 80% by weight of a broad-leaved craft pulp is required to have a total thickness equivalent to, or greater than, 60% of the thickness of the base paper as a whole.

When the fiber length of the pulp in any one of the layer adjacent to the front resin sheet and the other layer(s) is too small, the internal bonding strength of the base paper may decrease or the stiffness thereof may decrease. When the pulp fiber length of the layer adjacent to the front resin sheet is too large and equivalent to the length of the pulp fiber length of the other layer(s), the effect of the present invention is limitative. On the other hand, when the pulp fiber length of the layers as a whole is too large, no sufficient gloss appearance can be obtained. When the layer adjacent to the front resin sheet is composed of a conifer pulp, or when the other layer(s) is composed of a large content of a conifer pulp, the outcome is that the gloss appearance is impaired. When the layer adjacent to the front resin sheet is composed of a broad-leaved sulfite pulp, or when the other layer(s) is composed of a large content of a broad-leaved sulfite pulp, the stiffness is insufficient. When the thickness of the layer which is composed of a desired composition and adjacent to the front resin sheet is less than 10% of the total thickness of the base paper as a whole, the gloss appearance is insufficient, and when the above thickness exceeds 40%, the stiffness is insufficient. When the total thickness of the layer composed of a pulp composition which is beaten to an average fiber length of 0.5 to 0.8 mm and contains at least 80% by weight of a broad-leaved craft pulp is less than 60% of the total thickness of the base paper as a whole, some kinds of pulp used for compensating an amount deficiency may cause an insufficient stiffness or an insufficient gloss appearance.

Preferably, the above layer composed of a pulp composition which is beaten to an average fiber length of 0.5 to 0.8 mm and contains at least 80% by weight of a broad-leaved craft pulp is a layer having a thickness equivalent to, or greater than, 60% of a paper layer as a whole, which paper layer continues from the paper surface on the side opposite to the side where an image is to be formed. More preferably, the above paper layer consists of two layers, a layer composed of a broad-leaved tree craft pulp beaten to an average fiber length of 0.3 to 0.5 mm and a layer composed of a pulp composition which is beaten to an average fiber length of 0.5 to 0.8 mm and contains at least 80% by weight of a broad-leaved craft pulp. On the other hand, when the layer composed of a pulp composition which is beaten to an average fiber length of 0.5 to 0.8 mm and contains at least 80% by weight of a broad-leaved craft pulp has other layer in an intermediate position thereof, and if the "other layer" is composed of a conifer pulp, the conifer pulp is disadvantageous for the gloss appearance. A broad-leaved tree sulfite pulp is also disadvantageous in view of stiffness. Similarly, when other layer is present between the layer composed of a broad-leaved tree craft pulp beaten to an average fiber length of 0.3 to 0.5 mm and the layer composed of a pulp composition which is beaten to an average fiber length of 0.5 to 0.8 mm and contains at least 80% by weight of a broad-leaved craft pulp, and if the "other layer" is composed of a conifer pulp, the conifer pulp is disadvantageous for the gloss appearance. A broad-leaved tree sulfite pulp is also disadvantageous in view of stiffness.

In the supports I and II of the present invention, the pulp is preferably beaten so as to have a freeness in the range of from 250 ml to 360 ml, more preferably beanten to have a freeness of from 280 ml to 330 ml. When the freeness of the pulp is too low, the pulp may show insufficient paper making suitability, or the base paper may have low stiffness. When the freeness of the pulp is too high, the base paper tends to have a poor formation. In the present invention, the "freeness" refers to a freeness (ml) found by measuring a beaten pulp according to TAPPI Standard Pulp testing method No. T227m-58 "Freeness of Pulp".

In the supports I and II of the present invention, the pulp having a fiber length and a freeness in desirable ranges can be can be obtained by optimizing a balance between the cutting-based beating and the beating in a viscous state. Specifically, the balance between the cutting-based beating and the beating in a viscous state can be optimized by beating the pulp under a series of combined experimental conditions with regard to beating conditions such as a ratio of the cutting-based beating and the beating in a viscous state, a beating time, a pulp concentration and a beating power and measuring a sampled pulp slurry for a pulp fiber length and a freeness of the pulp.

In the supports I and II of the present invention, the layer(s) of the base paper other than the paper layer adjacent to the front resin sheet is generally composed of a natural pulp, while the natural pulp may contain a synthetic fiber or a synthetic pulp so long as it does not hamper the performance of the base paper. The natural pulp is preferably selected from wood pulps such as broad-leaved tree bleached kraft pulp, broad-leaved tree bleached sulfite pulp, conifer bleached kraft pulp, conifer bleached sulfite pulp and broad-leaved tree/conifer mixed bleached sulfite pulp. Further, various pulps including non-wood pulp, soda pulp, dissolving pulp and others such as reclaimed pulp (recylced paper pulp) may be used. In the support I of the present invention, the layer(s) adjacent to the front resin sheet is preferably composed of a broad-leaved tree sulfite pulp or a broad-leaved tree kraft pulp. In the support II of the present invention, the layer(s) adjacent to the front resin sheet is essentially required to be composed of a broad-leaved tree kraft pulp.

In the supports I and II of the present invention, each layer of the base paper may contain various additives which are added when paper material slurries are prepared. The additives include sizing agents such as fatty acid metal salt, fatty acid, emulsified alkyl ketene dimer or epoxidized higher fatty acid amide disclosed in JP-B-62-7534, emulsified alkenyl- or alkylsuccinic acid anhydride and a rosin derivative, dry paper strength reinforcing agents such as anionic, cationic or amphoteric polyacrylamide, polyvinyl alcohol, cationic starch and plant-originated galactomannan, wet paper strength reinforcing agents such as a polyamine polyamide epichlorohyrin resin, fillers such as clay, kaolin, calcium carbonate and titanium oxide, fixing agents such as aluminum chloride and water-soluble aluminum salt including aluminum sulfate, pH adjusting agents such as sodium hydroxide, sodium carbonate and sulfuric acid and others such as colorant pigments, colorant dyes and fluorescent brighteners disclosed in JP-A-63-20425 and JP-A-1-266537. The above additives are advantageously used in combination as required.

In the supports I and II of the present invention, the base paper may be impregnated with a composition containing any one of a water-soluble polymer, hydrophilic colloid or latex, an antistatic agent and other additives such as a pigment and a pH adjusting agent, or the above composition may be applied to the base paper, by size press, tub size press, etc., or with a blade, an air knife, etc. The water-soluble polymer or the hydrophilic colloid includes a starch-based polymer, a polyvinyl-alcohol-based polymer, a gelatin-based polymer, a polyacrylamide-based polymer and a cellulose-based polymer. The emulsion or the latex includes a petroleum resin emulsion, an emulsion or latex composed of at least ethylene and acrylic acid (or methacrylic acid) disclosed in JP-A-55-4027 and JP-A-1-18053, and an emulsion or latex of a styrene-butadiene copolymer, a styrene-acrylate copolymer, a vinyl acetate-acrylate copolymer, an ethylene-vinyl acetate copolymer, a butadiene-methyl methacrylate copolymer or a carboxy-modified product of any one of these. The antistatic agent includes alkali metal salts such as sodium chloride and potassium chloride, alkaline earth metal salts such as calcium chloride and barium chloride, colloidal metal oxides such as colloidal silica and organic antistatic agents such as polystyrene sulfonate. The pigment includes clay, kaolin, calcium carbonate, talc, barium sulfate and titanium oxide. The pH adjusting agent includes hydrochloric acid, phosphoric acid, citric acid and sodium hydroxide. The above colorant pigment, colorant dye and fluorescent brightener may be also used. The above additives are advantageously used in combination as required.

In the supports I and II of the present invention, the base paper is made such that the layer thickness non-uniformity index Rpy in a paper-making direction to be defined below is preferably 250 mV or less, more preferably 200 mV or less, particularly preferably 150 mV or less. The term "layer thickness non-uniformity index" refers to a value obtained by allowing a sample to run between two spherical tracers, scanning the sample in the paper-making direction of the sample after zero adjustment at a constant speed of 1.5 m/minute with a film thickness measuring apparatus which measures a thickness fluctuation of the sample as an electric signal through an electronic micrometer, under conditions where the sensitivity range of the electronic micrometer is ±15 μm/±3 V, to measure the sample for a thickness fluctuation in the paper-making direction, subjecting obtained measurement signal values to fast Fourier transform with an FFT analyzer using a hanning window as a time window, determining a power sepctrum (unit: $mV^2$) based on an addition mean of additions carried out 128 times, totalling power values in the frequency band of 2 Hz to 25 Hz, multiplying the total by ⅔ and raising the obtained product to ½ power.

For producing a base paper having a layer thickness non-uniformity index Rpy of 250 mV or less for the support I of the present invention, specifically, there is used at least 30% by weight, preferably at least 50% by weight, of a broad-leaved tree pulp which is properly beaten. For example, as a complete pulp for constituting the base paper, there is used a broad-leaved tree kraft pulp which is beaten to a fiber length of, preferably, 0.8 mm or less, more preferably 0.6 mm or less. The layer adjacent to the front resin sheet has a thickness of, preferably, at least 10 μm, more preferably at least 30 μm, particularly preferably at least 50 μm. And, for the above layer adjacent to the front resin sheet, further preferred is a pulp which is beaten to a fiber length of 0.3 mm to 0.5 mm. The base paper is preferably produced by making paper from the slurry containing additive chemicals with a Fourdrinier paper machine according to a proper paper-making method such that a uniform formation can be obtained.

For producing a base paper having a layer thickness non-uniformity index Rpy of 250 mV or less for the support II of the present invention, specifically, there is used at least 80% by weight of a broad-leaved tree pulp which is properly beaten. For example, as a complete pulp for constituting the base paper, there is used a broad-leaved tree kraft pulp which is beaten to a fiber length of 0.8 mm or less, preferably 0.6 mm or less. For the layer which adjacent to the front resin sheet and has a thickness equivalent to 10 to 40%, preferably 20 to 30%, of the thickness of the base paper, the pulp is beaten to a fiber length of 0.3 mm to 0.5 mm. The base paper is preferably produced by making paper from the slurry containing additive chemicals with a Fourdrinier paper machine according to a proper paper-making method such that a uniform formation can be obtained.

The base paper for each of the supports I and II can be produced by a combination of proper paper-making techniques in which a Fourdrinier paper machine having a proper upper dehydration mechanism, which machine causes proper turbulence on a paper material slurry, is used, multi-stage wet press, preferably at least three-stage wet press, is applied to a wet part, a smoothing roll is provided at the final stage of a press part, such that a uniform formation can be obtained, and the obtained paper is calendered with a machine calender, a super calender or a hot calender to form a base paper having a layer thickness non-uniformity index of 250 mV or less.

In the supports I and II of the present invention, the central plane average roughness SRa of the front surface of the base paper measured in a paper-making direction with a stylus-applied three-dimensional surface roughness tester at a cut-off value of 0.8 mm (the central plane average roughness on the front surface of a base paper in a paper-making direction at a cut-off value of 0.8 mm, measured with a stylus-applied three-dimensional surface roughness tester, will be sometimes simply abbreviated as "central plane average roughness SRa" hereinafter) is advantageously 1.50 $\mu$m or less, preferably 1.40 $\mu$m or less, more preferably 1.45 $\mu$m or less, most preferably 1.25 $\mu$m or less. In the present specification, the central plane average roughness at a cut-off value of 0.8 mm, measured with a stylus-applied three-dimensional surface roughness tester, is defined by the expression 1.

$$SRa = \frac{1}{Sa}\int_0^{WX} \int_0^{WY} |f(x, y)| dx dy$$

wherein Wx is a length of a sample surface region in an X-axis direction (paper-making direction), Wy is a length of the sample surface region in a Y direction (direction at speed angles with the paper-making direction), and Sa is an area of sample surface region.

Specifically, a machine SE-3AK and a machine SPA-11 supplied by Kosaka Laboratories (Japan) are used as a stylus-applied three-dimensional surface roughness tester and a three-dimensional roughness analyzer, and the central plane average can be determined under conditions where the cut-off value is 0.8 mm, Wx=20 mm, Wy=8 mm and therefore, Sa=160 mm$^2$. In data processing in the X-axis direction, sampling was carried out in 500 points, and scanning in the Y-axis direction is carried out in at least 17 lines.

The base paper having a central plane average roughness SRa of 1.50 $\mu$m or less, which is preferably used for the supports I and II of the present invention, can be specifically produced as follows. While a wet paper is dried, the wet paper is subjected to multi-staged bulk density increasing press. Further, the produced base paper is calendered in at least two lines by means of a machine calender, a super calender or a hot calender. For example, in the first line, the base paper is treated with a machine calender or a hot machine calender or both, and in the second line and thereafter, the base paper is treated with a machine calender as required and treated with a hot soft calender as described in JP-A-4-110938. Preferably, the base paper is impregnated with a water-soluble polymer, a hydrophilic colloid or a polymer latex, or any one of these is applied to the base paper, in an amount of at least 1.0 g/m$^2$, preferably at least 2.2 g/m$^2$ by size press, tub size press, blade coating or air knife coating.

In the supports I and II of the present invention, the density of the base paper, excluding an ash content, is preferably 0.80 g/cm$^3$ to 1.15 g/cm$^3$, more preferably 0.85 g/cm$^3$ to 1.05 g/cm$^3$, while the above density shall not be limited thereto. The thickness of the base paper is not specially limited, while the basis weight of the base paper is advantageously 40 g/m$^2$ to 250 g/m$^2$, preferably 70 g/m$^2$ to 220 g/m$^2$.

In the supports I and II for an imaging material, provided by the present invention, the surface (front surface) of the base paper where an image-forming layer is to be formed is coated with a resin sheet containing a resin having film formability. The reverse surface of the base paper is preferably coated with a resin sheet containing a resin having film formability.

When the resin having film formability in the front resin sheet and the resin having a film formability in the reverse resin sheet are thermoplastic resin(s), the support I and II are produced by a so-called melt-extrusion coating method in which resin composition(s) for the front resin sheet and the reverse resin sheet is/are cast in the form of a film onto a running base paper through a slit die with a melt extruder to coat the base paper. Generally, the support is produced by a series of steps in which a molten resin composition is extruded in the form of a film onto a running base paper through a slit die with a melt extruder and cast to coat the base paper, the so-formed films and the base paper are bonded under pressure between a press roll and a cooling roll and the resultant laminate is peeled from the cooling roll.

The present inventors have found that the effect of the present invention can be greatly remarkably exhibited owing to synergistic effects produced by constituting the front resin sheet of the support I as a multi-layered structure and constituting the base paper as a multi-layered structure. That is, the following has been found. By constituting the front resin sheet of the support I for an imaging material in the present invention as a structure of two or more layers, an imaging material having the above support and its print can be remarkably improved in gloss appearance, the support is remarkably improved in the property of peeling from a cooling roll when produced, to prevent the occurrence of peel non-uniformity, and therefore the support for an imaging material can be stably produced at a high speed.

The support I for an imaging material, provided by the present invention, has a front resin sheet constituted of two or more layers, while the front resin layer constituted of two layers is preferred for effectively accomplishing the object of the present invention.

In the support II for an imaging material in the present invention, it is more advantageous to constitute the front resin sheet as a structure of two or more layers for improving the gloss appearance.

In the supports I and II, preferably, the front resin sheet constituted as a structure of two or more layers is produced by a melt extrusion coating method. The front resin sheet is produced by a so-called co-extrusion coating method in which two or more layers are concurrently extruded to coat the base paper, or by a so-called consecutive extrusion coating method in which a resin layer at least for the lowermost layer is first melt-extruded in one station and a resin layer at least for the uppermost layer is finally melt-extruded in another station. Otherwise, there may be employed a method in which the support which is being produced is once taken up and then allowed to pass a resin coating line a plurality of times. In the present invention, preferred is the support for an imaging material having a two-layered resin sheet produced by the consecutive extrusion coating method.

The slit die for the melt extrusion coating is preferably selected from a T-die, an L-die, a fish tail die or a flat die, and the diameter of the slit opening is preferably 0.1 mm to 2 mm. The die for the multi-layer extrusion may be any die of a feed block type, a multi-manifold type or a multi-slot type. Although differing depending upon the kind of a resin, the temperature of the molten film is generally preferably 280° C. to 340° C., and the temperature of a resin composition for the uppermost layer and the temperature of a resin composition for a resin layer positioned below it may be different. For example, when the temperature of the resin composition for the uppermost layer is set at a temperature 5 to 10° C. lower than the temperature of the resin composition positioned below it, the resin layer is improved in the property of peeling from a cooling roll.

For the front resin sheet and the reverse resin sheet of the support I and the reverse resin sheet of the support II, the resin having film formability preferably includes thermoplastic resins such as a polyolefin resin, a polycarbonate resin, a polyester resin, a polyamide resin or a mixture of at least two of theses. In view of coatbility by melt extrusion, a polyolefin resin and a polyester resin are more preferred, and a polyethylene resin is particularly preferred. Further, the above resin may be selected from electron-beam-curable resins disclosed in JP-B-60-17104.

In the support II, a polyethylene resin is particularly preferred as a polyolefin resin used for forming the front resin sheet.

The above polyethylene resin includes a low-density polyethylene resin, an intermediate-density polyethylene resin, a high-density polyethylene resin, a linear low-density polyethylene resin, an ultra-low-density polyethylene resin, a copolymer of ethylene and α-olefin such as propylene or butylene, a co-called carboxy-modified polyethylene resin which is a copolymer or a graft copolymer of ethylene and acrylic acid, ethyl acrylate or maleic anhydride, a polyethylene resin obtained by a high-pressure radical polymerization method using an autoclave reactor or a tubular reactor, a polyethylene resin produced by polymerization in the presence of a metallocene polymerization catalyst and a polyethylene resin produced by polymerization in the presence of a metal catalyst other than metallocene according to a Ziegler method or a Phillips method. These polyethylene resins may be used alone or in combination. The density, the melt flow rates (MFR, defined under JIS K 6760), the molecular weight and the molecular weight distribution of the polyethylene resin are not specially limited, while, advantageously, the resin component (or mixture of resins) for constituting the resin sheet has a density of 0.90 to 0.97 g/cm$^3$, an MFR of 0.1 g/10 minutes to 50 g/10 minutes, preferably 0.3 g/10 minutes to 40 g/10 minutes.

The polyethylene resin produced by a high-pressure method, preferably used for the front resin layer of the support I or II includes various polyethylene resins having a long-chain branch, produced by a high-pressure method using an autoclave reactor or a tubular reactor. Examples of the above polyethylene resins produced by a high pressure method include a low-density polyethylene resin, an intermediate-density polyethylene resin, a copolymer of ethylene as a main component and an α-olefin such as propylene or butylene and a carboxy-modified ethylene resin. These polyethylene resins may be used alone or in combination. The density, MFR, the molecular weight and the molecular weight distribution of the polyethylene resin are not specially limited, while the polyethylene resin generally has a density of 0.90 to 0.95 g/cm$^3$ and an MFR of 0.1 to 50 g/10 minutes, preferably 0.4 to 50 g/10 minutes.

The polyethylene resin produced by polymerization in the presence of a metallocene polymerization catalyst, particularly preferably used for the front resin layer of the support I or II, refers to a resin produced by polymerization in the presence of a polymerization catalyst which is increased in catalytic activity by combining a zirconium- or hafnium-containing metallocene with, preferably, methylaluminoxane as is disclosed in PCT Japanese Translation Publication 3-502710, JP-A-3-234718, PCT Japanese Translation Publication 63-501369, JP-A-3-234717 and JP-A-3-234718. Examples of the polyethylene resin produced by polymerization in the presence of a metallocene polymerization catalyst include an ultra-low-density polyethylene resin, a low-density polyethylene resin, an intermediate-density polyethylene resin, a high-density polyethylene resin, a linear low-density polyethylene resin, a copolymer of ethylene as a main component and an α-olefin such as propylene or butylene and a carboxy-modified polyethylene resin. These polyethylene resins may be used alone or in combination. The density, MFR, the molecular weight and the molecular weight distribution of the polyethylene resin are not specially limited, while the polyethylene resin generally has a density of 0.87 to 0.97 g/cm$^3$ and an MFR of 0.05 to 500 g/10 minutes, preferably 0.08 to 300 g/10 minutes.

The polyethylene resin produced by polymerization in the presence of a metal polymerization catalyst other than metallocene, particularly preferably used for the front resin layer of the support I or II, includes various polyethylene resins produced, e.g., by a Ziegler method or a Phllips method. The polyethylene resin produced by polymerization in the presence of a metal polymerization catalyst other than metallocene includes an ultra-low-density polyethylene resin, a low-density polyethylene resin, an intermediate-density polyethylene resin, a high-density polyethylene resin, a linear low-density polyethylene resin, a copolymer of ethylene as a main component and an α-olefin such as propylene or butylene and a carboxy-modified polyethylene resin. These polyethylene resins may be used alone or in combination. The density, MFR, the molecular weight and the molecular weight distribution of the polyethylene resin are not specially limited, while the polyethylene resin generally has a density of 0.87 to 0.97 g/cm$^3$ and an MFR of 0.05 to 500 g/10 minutes, preferably 0.08 to 300 g/10 minutes.

The polyester resin used for the front resin sheet and the reverse resin sheet of the support 1 and for the reverse resin sheet of the support II includes a polyethylene terephthalate resin, a polybutylene terephthalate resin, a polyester-based biodegradable resin, a mixture of at least two of these and a mixture of at least one of these with a polyethylene resin. The density and the intrinsic viscosity [η] of the polyester resin are not specially limited. As a specific example, a polyester resin (trade name "NOVAPEX HS004" supplied by Mitsubishi Chemical Co., Ltd., melting point 235° C., density 1.33 g/cm$^3$, intrinsic viscosity [η] 0.73 dl/g) is available. Further, a mixture of a polyester resin with a polyethylene resin can be advantageously used. For example, a mixture (melting point 224° C., supplied by Mitsubishi Chemical Co., Ltd.) of a polyethylene terephthalate copolymer resin with a polyethylene copolymer resin (melting point 74° C.) graft-modified with maleic acid is available.

The polycarbonate resin used for the front resin sheet and the reverse resin sheet of the support I and the reverse resin sheet of the support II includes polycarbonate resins of various grades. Specifically, a polycarbonate resin (trade name: NOVAREX 7022A, density 1.20 g/cm$^3$, MFR 12 to 16 g/10 minutes, softening point 160° C. to 190° C.) supplied by Mitsubishi Chemical Co., Ltd. is available.

As a polyethylene resin for the reverse side sheet of the support I or II of the present invention, preferred is a compounded resin composition prepared by pre-melting and pre-mixing 90 to 65 parts by weight of a high-density polyethylene resin having an MFR of 10 g/10 minutes to 40 g/10 minutes, preferably 10 g/10 minutes to 30 g/10 minutes, and a density of at least 0.960 g/cm³ and 10 to 35 parts by weight of a low-density or intermediate-density polyethylene resin having an MFR of 0.2 g/10 minutes to 3 g/10 minutes, preferably 0.2 g/10 minutes to 1.5 g/10 minutes and a density of 0.935 g/cm³ or less. Concerning the molecular weight distribution of the low-density or intermediate-density polyethylene resin, preferably, the percentage of a polyethylene resin having a molecular weight of at least 500,000 is preferably at least 10% by weight, particularly preferably at least 12% by weight. When the percentage of a polyethylene resin having a molecular weight of at least 500,000 is less than 10% by weight, undesirably, the shapability is poor and in particular, "neck-in" is heavy. The above molecular weight is measured by a GPC method using 150-C supplied by Waters Co., Ltd. (columns: GMH-XL HT 8 mm$\phi$×30 cm×3 columns, supplied by Tosoh Corp., solvent: 1,2,4-trichlorobenzene, temperature 135° C., flow speed: 1 ml/min.)

As a polyethylene resin for the reverse resin sheet of the support I or II of the present invention, preferred is a pre-melted and pre-mixed compounded resin. The compounded resin is prepared by melting and mixing the low-density or intermediate-density polyethylene resin and the high-density polyethylene resin in advance according to a simple melt-mixing method or a multi-stage melt-mixing method. For example, there is advantageously employed a method in which predetermined amounts of the low-density or intermediate-density polyethylene and the high-density polyethylene are melted and mixed optionally together with an antioxidant, a lubricant and the like with an extruder, a twin-screw extruder, a hot roll kneader, a Banbury mixer or a pressure kneader and the resultant mixture is pelletized.

In the supports I and II of the present invention, the uppermost resin layer (to be sometimes abbreviated as "upper most layer" hereinafter) of the front resin sheet and a resin layer under it (to be sometimes abbreviated as "under resin layer" hereinafter) may have the same properties and the same composition or may have different properties and different compositions. The polyethylene resin for the uppermost layer and the polyethylene resin for the under resin layer can be selected from those polyethylene resins having the above density, MFR and molecular weight values and the above molecular weight distributions, and these resins may be used alone or in combination for each layer. When used in combination, those resins used may have the same properties or they may have different properties.

For example, the MFR of a polyethylene resin (including a mixture of at least two polyethylene resins) used for the uppermost layer may be higher or lower than, or the same as, the MFR of a polyethylene resin (including a mixture of at least two polyethylene resins, used in this sense hereinafter) used for the under resin layer. For example, a polyethylene resin having an MFR of 5 g/10 minutes to 20 g/10 minutes for the uppermost layer and a polyethylene resin having an MFR of 2 g/10 minutes to 10 g/10 minutes for the under resin layer may be used. Further, a polyethylene resin having an MFR of 2 g/10 minutes to 10 g/10 minutes for the uppermost layer and a polyethylene resin having an MFR of 5 g/10 minutes to 20 g/10 minutes for the under resin layer may be used. Further, polyethylene resin(s) having the same MFR values may be used for the uppermost layer and the lower resin layer.

Further, the density of a polyethylene resin (including a mixture of at least two polyethylene resins) used for the uppermost layer may be higher or lower than, or the same as, the density of a polyethylene resin (including a mixture of at least two polyethylene resins, used in this sense hereinafter) used for the under resin layer. For example, a polyethylene resin having a density of 0.925 g/cm³ to 0.970 g/cm³ for the uppermost layer and a polyethylene resin having a density of 0.870 g/cm³ to 0.925 g/cm³ for the under resin layer may be used. Further, a polyethylene resin having a density of 0.870 g/cm³ to 0.925 g/cm³ for the uppermost layer and a polyethylene resin having a density of 0.925 g/cm³ to 0.970 g/cm³ for the under resin layer may be used. Further, polyethylene resin(s) having the same density values may be used for the uppermost layer and the lower resin layer.

Further, at least one polyethylene resin whose melting point is higher or lower than, or the same as, the melting point of a polyethylene resin used for the under resin layer may be used for the uppermost layer. For example, a polyethylene resin having a melting point of at least 115° C. for the uppermost layer and a polyethylene resin having a melting point of less than 115°C. for the under resin layer may be used. Further, a polyethylene resin having a melting point of less than 115° C. for the uppermost layer and a polyethylene resin having a melting point of at least 115° C. for the under resin layer may be used. Further, polyethylene resin(s) having the same melting points may be used for the uppermost layer and the lower resin layer.

In view of the effects of the present invention, i.e., the achievements of remarkable effects on improvements in the gloss appearance of an imaging material and a print thereon and the property of peeling of the support, the following multi-layered front resin sheet of the supports I or II of the present invention is particularly preferred. That is, the front resin sheet has the uppermost layer composed of at least one polyethylene resin having a higher density than a polyethylene resin for the lower resin layer, at least one polyethylene resin having a higher melting point than a polyethylene resin for the lower resin layer, or at least one polyethylene resin having a higher density and a higher melting point than a polyethylene resin for the lower resin layer.

The front resin sheet of the support I or II of the present invention and the optionally provided reverse resin sheet of the support I or II may contain various additives. For improving the whiteness of the support and the sharpness of an image, it is preferred to incorporate a titanium dioxide pigment disclosed in JP-B-60-3430, JP-B-63-11655, JP-B-1-38291, JP-B-1-38292 and JP-A-1-105245. In addition to the titanium dioxide pigment, the front resin sheet and the reverse resin sheet may contain a white pigment such as zinc oxide, talc or calcium carbonate, a fatty acid amide such as stearic acid amide or arachic acid amide as a releasing agent, a fatty acid metal salt such as zinc stearate, calcium stearate, aluminum stearate, magnesium stearate, zinc palmitate, zinc myristate or calcium palmitate as a dispersing agent for a pigment and a releasing agent, an antioxidant such as hindered phenol, hindered amine, phosphorus-containing antioxidant or a sulfur-containing antioxidant disclosed in JP-A-1-105245, a blue pigment or dye such as Cobalt Blue, Ultramarine, Cerulein Blue or Phthalocyanine Blue, a magenta pigment or dye such as Cobalt Violet, Phosphite Violet or Manganese Violet, a fluorescent brightener disclosed in JP-A-2-254440, and an ultraviolet absorbent. The above additives are properly combined and incorporated. Preferably, these additives are incorporated as a master batch or a compound. In view of effective improvements in the sharpness or whiteness of a print and the heat resistance, light resistance and peeling properties of the support for an imaging material, it is preferred to incorporate higher concentrations of a white pigment such as titanium oxide and other additives such as a fluorescent brightener, a colorant pigment, a colorant dye, an antioxidant, an ultraviolet absorbent and a releasing agent into the uppermost layer than to the under resin layer.

In the supports I and II of the present invention, preferably, the base paper is subjected to activation treatment such as corona discharge treatment or flaming treatment before the base paper is coated with compositions for the front and reverse resin sheets. Further, as described in JP-B-61-42254, an ozone-containing gas may be blown to a molten resin composition which is to be brought into contact with the base paper, before the running base paper is coated with the resin layer. The front and reverse resin sheets are respectively coated on the base paper preferably by continuous extrusion, a so-called tandem extrusion coating method. Further, the reverse resin sheet may be a multi-layered coating having at least two layers as well. The front resin sheet of the support for an imaging material may be treated so as to have a gloss surface, a finely roughened surface disclosed in JP-B-62-19732, a matted surface or a meshed surface, and preferably, the reverse resin sheet is generally treated so as to have a gloss-free surface.

In each of the supports I and II of the present invention, the thickness of the entire front resin sheet is advantageously 8 to 100 µm, preferably 12 to 60 µm, particularly preferably 18 to 40 µm. Although not specially limited, the thickness of the lowermost layer of the front resin sheet of the support I and the thickness of the lowermost resin layer of the front resin layer of the support II when the front resin layer has a multi-layered structure, are preferably at least 25%, more preferably at least 39%, particularly preferably at least 50%, of the front resin sheet, in view of the effect on improvement in the gloss appearance of an imaging material and a print thereon. The reverse surface of the base paper is preferably coated with the reverse resin sheet composed mainly of a resin having film formability. The above resin is preferably a polyethylene resin. The thickness of the reverse resin sheet is preferably well-balanced with the thickness of the front resin sheet concerning curl resistance. The thickness of the reverse resin sheet is advantageously 8 to 100 µm, preferably 12 to 60 µm.

The support III for an imaging material (to be sometimes referred to as "support III" hereinafter), provided by the present invention, will be explained below.

In the support II of the present invention, the front resin sheet is a multi-layered resin sheet composed of an upper layer (surface layer) A and a lower layer (B) (which refers to one layer or layers present under the surface layer). The upper layer (A) is required to contain at least 50% by weight of a polyethylene resin (a) having a density of at least 0.940 g/cm$^3$. When the content of the polyethylene resin (a) is less than 50% by weight, there is no sufficient effect on the improvement of the gloss appearance of the imaging material and a print thereon. In view of the effect on the above improvement, the above content is preferably at least 60% by weight, particularly preferably at least 70% by weight. Further, when the density of the polyethylene resin (a) is less than 0.940 g/cm$^3$, there is no sufficient effect on the improvement of the gloss appearance of the imaging material and a print thereon. In view of the effect on the above improvement, the above density is preferably at least 0.945 g/cm$^3$, particularly preferably at least 0.950 g/cm$^3$.

The above polyethylene resin (a) can be selected from various polyethylene resins, and polyethylene resins having various density values, melt flow rates, molecular weights and molecular weight distributions may be used alone or in combination. When a mixture of polyethylene resins is used, it is sufficient that the mixture should have a density (calculated density) of at least 0.940 g/cm$^3$.

The thickness of the layer (A) is required to be equivalent to, or smaller than, the thickness of the multi-layered resin sheet. When the above thickness exceeds 50%, the effects of the present invention are not sufficiently exhibited. In view of the effects, the thickness of the layer (A) is preferably equivalent to, or smaller than, 35%, particularly preferably 20%, of the thickness of the multi-layered resin sheet.

In the front multi-layered resin sheet of the support III of the present invention, the polyethylene resin having a density of at least 0.94 g/cm$^3$, contained in the upper layer (A), includes a polyethylene resin produced in the presence of a metallocene polymerization catalyst, a polyethylene resin produced in the presence of a metal catalyst other than the metallocene polymerization catalyst and a mixture of them.

The polyethylene resin produced by polymerization in the presence of a metallocene polymerization catalyst refers to a resin produced by polymerization in the presence of a polymerization catalyst which is increased in catalytic activity by combining a zirconium- or hafnium-containing metallocene with, preferably, methylaluminoxane as is disclosed in PCT Japanese Translation Publication 3-502710, JP-A-60-356, PCT Japanese Translation Publication 63-501369, JP-A-3-234717 and JP-A-3-234718. Examples of the polyethylene resin produced by polymerization in the presence of the above metallocene polymerization catalyst include an intermediate-density polyethylene resin, a high-density polyethylene resin, a copolymer of ethylene as a main component and an α-olefin such as propylene or butylene and a carboxy-modified polyethylene resin. These polyethylene resins may be used alone or in combination. The density, the melt flow rate, the molecular weight and the molecular weight distribution of the polyethylene resin are not specially limited, while the polyethylene resin generally has a density of 0.94 to 0.97 g/cm$^3$, preferably 0.950 to 0.970 g/cm$^3$, particularly preferably 0.960 to 0.970 g/cm$^3$ and a melt flow rate of 0.05 to 500 g/10 minutes, preferably 0.08 to 300 g/10 minutes.

The polyethylene resin produced by polymerization in the presence of a metal polymerization catalyst other than metallocene, particularly preferably used for the above front resin layer (A), includes various polyethylene resins produced, e.g., by a Ziegler method or a Phllips method. The polyethylene resin produced by polymerization in the presence of a metal polymerization catalyst other than metallocene includes an intermediate-density polyethylene resin, a high-density polyethylene resin, a copolymer of ethylene as a main component and an α-olefin such as propylene or butylene and a carboxy-modified polyethylene resin. These polyethylene resins may be used alone or in combination. The density, the melt flow rate, the molecular weight and the molecular weight distribution of the polyethylene resin are not specially limited, while the polyethylene resin generally has a density of 0.94 to 0.97 g/cm$^3$, preferably 0.950 to 0.970 g/cm$^3$, particularly preferably 0.960 to 0.970 g/cm$^3$ and a melt flow rate of 0.05 to 500 g/10 minutes, preferably 0.08 to 300 g/10 minutes.

In the support III of the present invention, for improving the curl resistance of the imaging material and its print and the shapability of the resin composition for the upper layer (A), it is preferred to use the above polyethylene resin having a density of at least 0.940 g/cm$^3$ and a polyethylene resin (to be described later) having a density of less than 0.940 g/cm$^3$, preferably a density equivalent to, or smaller than, 0.928 g/cm$^3$, more preferably a density equivalent to, or smaller than, 0.924 g/cm$^3$, particularly preferably a density equivalent to, or smaller than, 0.918 g/cm³. The term "shapability" in the present specification refers to overall shapability including the degree of "neck-in", film breakage depending upon the degree of drawdown, the unstableness of flow caused by surging or draw resonance, the degree of occurrence of streaks on a molten resin film and the degree of occurrence of "fouling" in a die lip.

The lower layer (B) of the multi-layered resin sheet is required to contain a largest amount of a polyethylene resin (b) having a density of less than 0.940 g/cm³ among polyethylene-based resins in the layer (B). When the density of the above polyethylene resin (b) is 0.940 g/cm³ or greater, there is no sufficient effect on the improvement in curl resistance. In view of the effect on the above improvement, the above density is preferably 0.928 g/cm³ or lower, more preferably 0.924 g/cm³ or lower, particularly preferably 0.921 g/cm³.

The above polyethylene resin (b) can be selected from various polyethylene resins, and the melt flow rate, the molecular weight and the molecular weight distributions of the polyethylene resin (b) are not specially limited. Various polyethylene resins may be used alone or in combination. When a mixture of polyethylene resins is used, it is sufficient that the mixture should have a density (calculated density) of less than 0.940 g/cm³.

The polyethylene resin having a density of less than 0.940 g/cm³, used for the lower layer (B), includes a polyethylene resin produced by a high-pressure method, a polyethylene resin produced by polymerization in the presence of a metallocene polymerization catalyst, a polyethylene resin produced by polymerization in the presence of a metal catalyst other than metallocene and a mixture of at least two of these.

The above polyethylene resin having a density of less than 0.940 g/cm³ for the lower layer (B), produced by a high-pressure method, includes various polyethylene resins having a long-chain branch, produced by a high-pressure method using an autoclave reactor or a tubular reactor. Examples of the polyethylene resins produced by a high-pressure method include a low-density polyethylene resin, an intermediate-density polyethylene resin, a copolymer of ethylene as a main component and an α-olefin such as propylene or butylene and a carboxy-modified polyethylene resin. These polyethylene resins may be used alone or in combination. The melt flow rate, the molecular weight and the molecular weight distribution of the polyethylene resin are not specially limited, while the polyethylene resin generally has a density of 0.90 to less than 0.94 g/cm³ preferably 0.90 to 0.928 g/cm³ more preferably 0.90 to 0.924 g/cm³ particularly preferably 0.90 to 0.921 g/cm³ and a melt flow rate of 0.1 to 50 g/10 minutes, preferably 0.4 to 50 g/10 minutes.

The polyethylene resin having a density of less than 0.940 g/cm³ for the lower layer (B), produced by polymerization in the presence of a metallocene polymerization catalyst is a resin produced by polymerization in the presence of a polymerization catalyst which is increased in catalytic activity by combining a zirconium- or hafnium-containing metallocene with, preferably, methylaluminoxane as is disclosed in PCT Japanese Translation Publication 3-502710, JP-A-60-356, PCT Japanese Translation Publication 63-501369, JP-A-3-234717 and JP-A-3-234718. Examples of the polyethylene resin produced by polymerization in the presence of the above metallocene polymerization catalyst include an ultra-low-density polyethylene resin, a low-density polyethylene resin, an intermediate-density polyethylene resin, a linear low-density polyethylene resin, a copolymer of ethylene as a main component and an α-olefin such as propylene or butylene and a carboxy-modified polyethylene resin. These polyethylene resins may be used alone or in combination. The density, the melt flow rates, the molecular weight and the molecular weight distribution of the polyethylene resin are not specially limited, while the polyethylene resin generally has a density of 0.87 to less than 0.94 g/cm³, preferably 0.870 to 0.928 g/cm³, more preferably 0.870 to 0.924 g/cm³, particularly preferably 0.870 to 0.921 g/cm³ and a melt flow rates of 0.05 to 500 g/10 minutes, preferably 0.08 to 300 g/10 minutes.

The polyethylene resin having a density of less than 0.940 g/cm³ for the lower layer (B), produced by polymerization in the presence of a metal polymerization catalyst other than a metallocene polymerization catalyst includes various polyethylene resins produced, e.g., by a Ziegler method or a Phllips method. The polyethylene resin produced by polymerization in the presence of a metal polymerization catalyst other than metallocene includes an ultra-low-density polyethylene resin, a low-density polyethylene resin, an intermediate-density polyethylene resin, a linear low-density polyethylene resin, a copolymer of ethylene as a main component and an α-olefin such as propylene or butylene and a carboxy-modified polyethylene resin. These polyethylene resins may be used alone or in combination. The density, the melt flow rate, the molecular weight and the molecular weight distribution of the polyethylene resin are not specially limited, while the polyethylene resin generally has a density of 0.87 to less than 0.94 g/cm³, preferably 0.870 to 0.928 g/cm³, more preferably 0.870 to 0.924 g/cm³, particularly preferably 0.870 to 0.921 g/cm³ and a melt flow rate of 0.05 to 500 g/10 minutes, preferably 0.08 to 300 g/10 minutes.

When at least two polyethylene resins having different melt flow rates are used in combination for the upper layer or the lower layer of the multi-layered sheet of the support III, it is preferred to use these polyethylene resins as a compounded resin composition prepared by melting and mixing them in advance. For example, when a polyethylene resin having a melt flow rate of 5 to 40 g/10 minutes and a polyethylene resin having a melt flow rate of 0.2 to 4.5 g/10 minutes are used in combination, it is preferred to use these polyethylene resins as a pre-melted and pre-mixed compounded resin composition. The so-prepared compounded resin composition is preferred in view of shapability, film uniformity and the prevention of clotting of a non-uniform resin called a resin gel. The compounded resin composition can be prepared by various methods, for example, a method in which at least two polyethylene resins are melted and mixed optionally together with other thermoplastic resin and additives such as an antioxidant, a lubricant and the like with a kneading extruder, a hot roll mill, a Banbury mixer or a pressure kneader and the resultant mixture is pelletized.

Although not specially limited, the melt flow rate of the polyethylene resin components as a total in the resin composition for the upper layer (A) or the lower layer (B) of the multi-layered resin sheet is preferably 2 to 20 g/10 minutes, more preferably 3 to 15 g/10 minutes in view of the melt extrusion coatability of the resin composition, shapability and the effect on the improvement in gloss appearance.

The reverse surface of the support III of the present invention is preferably coated with a resin sheet (C) containing a resin (c) having film formability. The resin (c) is preferably selected from thermoplastic resins such as a polyolefin resin, a polycarbonate resin and a polyamide resin. Of these, in view of melt extrusion coatability, a polyolefin resin is more preferred, and a polyethylene resin is particularly preferred. Further, an electron-beam-curable resin disclosed in JP-B-60-17104 may be also used.

The polyethylene resin preferred for the reverse resin sheet of the support III is preferably a compounded resin composition which is prepared by pre-melting and pre-mixing 90 to 65 parts by weight of a high-density polyethylene resin having a melt flow rate of 10 g/10 minutes to 40 g/10 minutes and a density of at least 0.960 g/cm$^3$ and 10 to 35 parts by weight of an low-density or intermediate polyethylene resin having a melt flow rate of 0.2 g/10 minutes to 3 g/10 minutes and a density of at least 0.935 g/cm$^3$ or less.

As already described, the front multi-layered resin sheet of the support III has a structure of at least two layers, the upper layer (A) containing at least 50% by weight of the polyethylene resin (a) and the lower layer (B) containing a largest amount of the polyethylene resin (b).

The "upper" and "lower" in the present invention shows a relative-positional relationship in which the upper layer (A) is far from the base paper and the lower layer (B) is close to the base paper. In the constitution of the support III of the present invention, in view of the effects of the present invention, preferably, the upper layer is the uppermost layer, and the lower layer is the lowermost layer, and more preferably, the lower layer (B) constitutes an intermediate layer and the lowermost layer.

The resin layer of the upper layer (A) or the lower layer (B) may contain other resin (other than the resins (a) and (b)), e.g., a homopolymer such as a polyethylene resin, polybutene or a polypentene, a copolymer of at least two α-olefins such as an ethylene-butylene copolymer or a polyester resin so long as the effects of the present invention are not impared and so long as the requirements of the present invention are satisfied.

The front resin sheet of the support III of the present invention may have a multi-layered structure of two layers or more, while, for efficiently achieving the object of the present invention, a two-layered or three-layered structure is preferred, and a three-layered structure of the uppermost layer, an intermediate layer and the lowermost layer is particularly preferred. The support III of the present invention is produced by a so-called melt extrusion coating method in which a resin composition molten under heat is cast onto a running base paper to coat it. For the above production, there may be employed a so-called co-extrusion coating method in which two or more resin layers for the support III are formed by concurrent-extrusion coating, or there may be employed a so-called consecutive extrusion coating method in which a resin layer for the lowermost layer is formed by melt extrusion coating in one station and then at least a resin layer for the uppermost layer is formed by melt extrusion coating in another station. In the present invention, when the front resin sheet has a structure of at least three layers, in view of the effect on improvement in gloss appearance of the imaging material and a print thereon, preferred is a support produced by a consecutive extrusion coating method in which at least resin layer for the lowermost layer is formed by melt extrusion coating, and then resin layers for the intermediate layer and the uppermost layer are formed by concurrent extrusion with another two-layer co-extruder. Further, when the consecutive extrusion coating is carried out, the resin layer for at least the lowermost layer may be subjected to activation treatment such as corona discharge treatment.

The slit die used for the melt extrusion coating is preferably selected from a T-die, an L-die, a fish tail die or a flat die, and the diameter of the slit opening is preferably 0.1 mm to 2 mm. The die for the multi-layer co-extrusion may be any die of a feed block type, a multi-manifold type or a multi-slot type. The temperature of the molten film is preferably 270° C. to 340° C., and the temperature of a resin composition for the uppermost layer and the temperature of a resin composition for a resin layer positioned under it may be different. For example, when the temperature of the resin composition for the uppermost layer is set at a temperature 5 to 20° C. lower than the temperature of the resin composition for a resin layer under it, the resin layer is improved in the property of peeling from a cooling roll.

In the support III of the present invention, the total thickness of the front resin sheet composed of at least two layers is advantageously 8 to 100 μm, preferably 12 to 60 μm, particularly preferably 18 to 40 μm. Further, in view of the effects on the improvements in gloss appearance of the imaging material and a print thereon and the curl resistance, the thickness of the upper layer (A) is preferably 35% or less, particularly preferably 20% or less, of the thickness of the front multi-layered resin sheet, although it is not specially limited. Further, the reverse surface of the base paper is preferably coated with a reverse resin sheet (C) composed mainly of a resin (c) having film formability. The resin (c) is preferably a polyethylene resin. The thickness of the reverse resin sheet (C) is particularly preferably determined so as to be well-balanced with the thickness of the front resin sheet concerning curl resistance. The thickness of the reverse resin sheet (C) is generally advantageously 8 to 100 μm. preferably 12 to 60 μm.

In the support III of the present invention, it is preferred to subject the base paper to activation treatment such as corona discharge treatment or flaming treatment before the resin composition for the front and reverse resin sheets are coated on the base paper. Further, as described in JP-B-61-42254, an ozone-containing gas may be blown to a molten resin composition which is to be brought into contact with the base paper, before the running base paper is coated with the resin layer. The front and reverse resin sheets are respectively coated on the base paper preferably by continuous extrusion, a so-called tandem extrusion coating method. Further, the reverse resin sheet may be a multi-layered coating having at least two layers as well. The front resin sheet of the support III for an imaging material may be treated so as to have a mirror surface, a gloss surface or a finely roughened surface disclosed in JP-B-62-19732, and preferably, the reverse resin sheet is generally treated so as to have a gloss-free surface.

The front resin sheet and the optionally provided reverse resin sheet of the support III of the present invention may contain various additives. Examples of the additives include those specified with regard to the supports I and II.

The support III of the present invention uses a base paper composed mainly of a natural pulp. The fiber length of the above natural pulp which is beaten before chemicals for paper are added is 0.45 mm to 0.65 mm. In view of the effect on improvements in the gloss appearance of an imaging material and a print thereon and the strength of stiffness thereof, the above fiber length is preferably 0.48 mm to 0.62 mm, more preferably 0.50 mm to 0.59 mm, particularly preferably 0.53 mm to 0.59 mm. Specifically, a natural pulp having a fiber length in the above range can be prepared by selecting a proper pulp, beating the pulp with a beating machine having a proper structure under a series of combined experimental conditions with regard to beating conditions such as a beating time, a pulp concentration and a beating power and measuring a sampled pulp slurry for a pulp fiber length. Further, as a condition of beating the pulp, it is preferred to optimize the balance between the cutting-based beating and the beating in a viscous state, and the freeness of the beaten pulp is preferably 200 ml to 400 ml, more preferably 230 ml to 370 ml, particularly preferably 260 ml to 340 ml.

The base paper for the support III of the present invention is preferably a natural pulp paper composed mainly of a natural pulp. Further, the base paper may be a mixed paper composed of a natural pulp as a main component and a synthetic pulp or a synthetic pulp. As the natural pulp, it is preferred to use a properly selected natural pulp disclosed in JP-A-58-37642, JP-A-60-67940, JP-A-60-69649 and JP-A-61-35442. The natural pulp can be advantageously selected from a conifier pulp, a broad-leaved tree pulp and a mixture of a conifer pulp and broad-leaved tree pulp which are subjected to general bleaching treatment such as treatment with hydrochloric acid, hypochlorite or chlorine dioxide, alkali-extraction or -treatment and optional bleaching treatment with hydrogen peroxide or oxygen, or a combination of these treatments. Further, various pulps such as a kraft pulp, a sulfite pulp and a soda pulp may be used, while a broad-leaved tree bleached craft is advantageously used.

In the base paper composed mainly of a natural pulp, used for the support III of the present invention, various additives may be added to a paper material slurry when the slurry is prepared. Examples of these additives include those specified with regard to the supports I and II.

Further, the base paper composed mainly of a natural pulp, used for the support III of the present invention, may be impregnated or coated with a composition containing any one of a water-soluble polymer, a hydrophilic colloid and a latex, an antistatic agent and other additive by size press, tub size press or coating such as blade coating or air knife coating. Examples of components of the above composition include those specified with regard to the supports I and II.

The thickness of the base paper for the support III is not specially limited, while the basis weight of the base paper is preferably 30 g/m$^2$ to 250 g/m$^2$, and the basis weight of the base paper for a photographic print is more preferably 70 g/m$^2$ to 220 g/m$^2$, particularly preferably 150 g/m$^2$ to 200 g/m$^2$.

In the base paper composed mainly of a natural pulp for the support III of the present invention, the central plane average roughness SRa of the front surface of the base paper measured in a paper-making direction with a stylus-applied three-dimensional surface roughness tester at a cut-off value of 0.8 mm is preferably 1.5 $\mu$m or less, more preferably 1.4 $\mu$m or less, particularly preferably 1.3 $\mu$m or less.

According to studies by the present inventors, specifically, it has been found that the base paper having a central plane average roughness SRa of 1.5 $\mu$m or less can be obtained by the following method, preferably by a combination of at least two methods below, more preferably by a combination of at least three methods below.

(1) As a natural pulp, it is preferred to use a broad-leaved tree bleached kraft pulp or a combination of a broad-leaved tree bleached kraft pulp and a broad-leaved tree bleached sulfite pulp. Further, there is used a natural pulp which is beaten so as to have an optimum fiber length and an optimum freeness as described above.

(2) During the drying of a wet paper, a bulk density increasing press is used. Specifically, a wet paper is subjected to a multi-stage bulk density increasing press as disclosed, for example, in JP-A-3-29945.

(3) Prior to forming an image-forming layer, the surface of the base paper where an image-forming layer is to be formed is coated with a layer formed of a coating composition containing a binder, preferably a water-soluble polymer, a hydrophilic colloid or a polymer latex. Specifically, the surface of the base paper where an image-forming layer is to be formed is coated with a coating composition containing a water-soluble polymer, a hydrophilic colloid or a polymer latex by size press, tub size press, blade coating or air knife coating to form a layer having a solid coating amount of at least 2 g/cm$^2$, preferably at least 5 g/cm$^2$. Further, the layer formed by the above coating preferably contains an inorganic or organic pigment for further improving the layer in flatness.

(4) The produced base paper is calendered in at least two lines by means of a machine calender, a super calender or a hot calender. Specifically, in the first line, the base paper is treated with a machine calender or a hot machine calender or both, and in the second line and thereafter, the base paper is treated with a machine calender, a hot calender or a hot soft calender as described in JP-A-4-110938. It is particularly preferred to treat the base paper with a combination of these. Further, the calender treatment in the second line and thereafter is preferably carried out on machine after the base paper is produced.

After the surface of the front resin sheet of any one of the supports I, II and III of the present invention is subjected to activation treatment such as corona discharge treatment or flaming treatment, an undercoat layer may be formed on the surface as disclosed in JP-A-61-84643, JP-A-1-92740, JP-A-1-102551 or JP-A-1-166035. Further, after the surface of the back resin sheet of any one of the supports I, II and III of the present invention is subjected to activation treatment such as corona discharge treatment or flaming treatment, a back coating layer may be formed on the surface for antistatic performance, and the like. The back coating layer may contain a proper combination of an inorganic antistatic agent, an organic antistatic agent, a hydrophilic binder, a latex, a curing agent, a pigment and a surfactant disclosed in JP-B-52-18020, JP-B-57-9059, JP-B-57-53940, JP-B-58-58859, JP-A-59-214849 and JP-A-58-184144.

Various photograph-constituting layers are formed on the supports I, II and III for imaging materials, provided by the present invention, and the supports I, II and III are used in a variety of fields including a photograph printing paper, a monochrome photograph printing paper, a photocomposition printing paper, a copy printing paper, a reversal photograph material, a negative or positive imaging material by a silver salt diffusion transfer method and a printing material. For example, an emulsion layer of a silver chloride, silver bromide, silver chlorobromide, silver iodide or silver chloroiodide may be formed thereon. A color coupler is contained in a silver halide emulsion layer to form a silver halide color photograph-constituting layers. A layer for constituting a photograph by a silver salt diffusion method may be formed thereon. As a binder for the above photograph-constituting layers, there may be used hydrophilic polymer materials such as polyvinyl pyrrolidone, polyvinyl alcohol, a sulfate ester compound of polysaccharide and the like, besides generally used gelatin. Further, the above photograph-constituting layers may contain various additives. Examples of the additive include sensitizing dyestuffs such as cyanine dyestuff and merocyanine dyestuff, chemically sensitizing agents such as a water-soluble gold compound and a sulfur compound, anti-fogging agents or stabilizers such as a hydroxy-trizaolopyrimidine compound and a mercaptoheteocyclic compound, film-curing agents such as formalin, a vinyl sulfone compound, an aziridine compound and an active halogen compound, application aids such as alkylbenzenesulfonate and sulfosuccinate, pollution preventers such as a dialkylhdyroquinone compound, a fluorescent brightener, a sharpness-improving dyestuff, an antistatic agent, a pH adjuster and a fogging agent. Further, water-soluble iridium and a water-soluble rhodium compound may be incorporated when silver halide is formed and dispersed.

A photographic material using the support I, II or III of the present invention can be subjected to treatments such as exposure, development, termination, fixing, bleaching and stabilization depending upon the photographic material as described in "Photographic Photosensitive Materials and Handling Method" (Syashin Gijutsu Koza 2, MIYAMOTO Goro, Kyoritsu Publishing Co. Japan). Further, a multi-layered silver halide color photographic material may be treated with a developer solution containing development promoters such as benzyl alcohol, thallium salt and phenidone, or it may be treated with a developer solution substantially containing no benzyl alcohol.

The supports I, II and III for imaging materials, provided by the present invention, on which various thermal transfer type heat transfer record receiving layers are formed, can be used as various thermal transfer type heat transfer record receiving materials. The synthetic resin which can be used for forming the above thermal transfer type heat transfer record receiving layers includes resins having an ester bond such as a polyester resin, a polyacrylate ester resin, a polycarbonate resin, a polyvinyl acetate resin, a polyvinyl butyral resin, a styrene acrylate resin and a vinyltoluene acrylate resin, resins having a urethane bond such as a polyurethane resin, resins having an amide bond such as a polyamide resin, resins having a urea bond such as a urea resin, and other resins such as a polycarprolactam resin, a styrene resin, a polyvinyl chloride resin, a vinyl chloride-vinyl acetate copolymer resin and a polyacrylonitrile resin. A mixture or a copolymer of these may be also used.

In the present invention, the above thermal transfer type heat transfer record receiving layer may also contain a releasing agent and a pigment in addition to the above resin(s). The releasing agent includes solid waxes such as polyethylene wax, amide wax and Teflon powder, a fluorine-containing or phosphate ester-containing surfactant and silicone oil. Of these releasing agents, silicone oil is the most preferred. The silicone oil may be in the form of an oil, while a curable silicone oil is preferred. The curable silicone oil includes reaction-curable, photo-curable and catalyst-curable silicone oils, while a reaction-curable silicone oil is the most preferred. The reaction-curable silicone oil includes amino-modified silicone oil and epoxy-modified silicone oil. The content of the above reaction-curable silicone oil in the receiving layer is preferably 0.1 to 20% by weight. The above pigment is preferably selected from extender pigments such as silica, calcium carbonate, titanium oxide and zinc oxide. The thickness of the receiving layer is preferably 0.5 to 20 $\mu$m, more preferably 2 to 10 $\mu$m.

The supports I, II and III for imaging materials, provided by the present invention, can be used as supports on which various ink receiving layers are formed. The ink receiving layer may contain a binder for improving the drying capability of an ink and for improving the sharpness (clearness) of an image. Specific examples of the binder include various gelatins such as lime-treated gelatin, acid-treated gelatin, enzyme-treated gelatin, a gelatin derivative, modified gelatin prepared by reacting gelatin with an anhydride of dibasic acid such as phthalic acid, maleic acid or fumaric acid, polyvinyl alcohols having various saponification degrees, carboxy-modified, cation-modified or amphoteric polyvinyl alcohol and a derivative thereof, starches such as oxidized starch, cationized starch, etherified starch, cellulose derivatives such as carboxymethyl cellulose and hydroxyethyl cellulose, synthetic polymers such as polyvinylpyrrolidone, polyvinylpyridium halide, sodium polyacrylate, acrylate-methacrylate copolymer salt, polyethyelene glycol, polypropylene glycol, polyvinyl ether, alkylvinyl ether-maleic anhydride copolymer, styrene-maleic anhydride copolymer and salt thereof and polyethyleneimine, conjugated diene copolymer latexes such as styrene-butadiene copolymer and methyl methacrylate-butadiene copolymer, vinyl acetate polymer latexes such as polyvinyl acetate, vinyl acetate-maleate copolymer, vinyl acetate-acrylate copolymer and ethylene-vinyl acetate copolymer, latexes of acrylate polymers or copolymers such as acrylate polymer, methacrylate polymer, ethylene-acrylate copolymer and styrene-acrylate copolymer, vinylidene chloride copolymer latexes, functional-group-modified polymer latexes prepared by modifying the above polymers with a monomer containing a functional group such as a carboxyl group, water-based adhesives including thermosetting synthetic resins as a melamine resin and a urea resin, synthetic resin adhesives such as polymethyl methacrylate, a polyuretnane resin, an unsaturated polyester resin, vinyl chloride-vinyl acetate copolymer, polyvinyl butyral and an alkyd resin, and inorganic binders such as alumina sol and silica sol disclosed in JP-A-3-24906, JP-A-3-281383 and Japanese Patent Application No. 4-240725. The above binders may be used alone or in combination.

The ink receiving layer of the inkjet recording material in the present invention may contain other additives in addition to the binder. Examples of the additives include surfactants including anionic surfactants such as long-chain alkylbenzenesulfonate and long-chain, preferably branched, alkylsulfosuccinate, nonionic surfactants such as polyalkylene oxide ether of lone-chain, preferably branched, alkyl group-containing phenol and polyalkylene oxide ether of long-chain alkyl alcohol and fluorinated surfactants disclosed in JP-B-47-9303 and U.S. Pat. No. 3,589,906, silane coupling agents such as γ-aminopropyltriethoxysilane and N-β(aminoethyl)γ-aminopropyl trimethoxysilane, polymer curing agents such as an active halogen compound, a vinylsulfone compound, an aziridine compound, an epoxy compound, an acryloyl compound and an isocyanate compound, antiseptics such as p-hydroxybenzoate compounds disclosed in JP-A-1-102551, a benzthiazolone compound and an isothiazolone compound, colorant pigments disclosed in JP-A-63-204251 and JP-A-1-266537, colorant dyes, fluorescent brighteners, yellowing preventers such as sodium hydroxymethanesulfonate and sodium p-toluenesulfonate, ultraviolet absorbents such as a benzotriazole compound having a hydroxy-dialkylphenyl group on the 2-position, antioxidants such as poly-hindered-phenol compounds disclosed in JP-A-1-105245, handwritable materials such as organic or inorganic fine particles of starch powder, barium sulfate or silicon dioxide having a particle diameter of 0.2 to 5 $\mu$m and organopolysiloxane compounds disclosed in JP-A-4-1337, pH adjusters such as sodium hydroxide, sodium carbonate, sulfuric acid, phosphoric acid and citric acid, octyl alcohol and a silicon-containing antifoamer. The above additives are used in proper combination.

The supports for imaging materials, provided by the present invention, can provide imaging materials and prints thereon which have high gloss appearance and are free of non-uniformity in gloss. Further, the supports are improved in the properties of peeling from a cooling roll and are free from the occurrence of non-uniform peeling. Moreover, the supports have excellent curl resistance and strong stiffness, and the supports can be stably produced at a high speed and are therefore excellent in economic performance.

The present invention will be explained with reference to Examples hereinafter, while the present invention shall not be limited by Examples.

EXAMPLES 1–4 AND COMPARATIVE EXAMPLES 1–5

A broad-leaved tree pulp was adjusted to a concentration of 4% by weight in terms of an absolute dry weight and beaten so as to have a pulp fiber length of 0.6 mm and a Canadian Standard freeness of 350 ml. After the beating, 3 parts by weight of cationized starch, 0.2 part by weight of anionized polyacrylamide, 0.4 part by weight (as ketene dimer content) of an alkylketene dimer emulsion, 0.4 part by weight of a polyamide epichlorohydrin resin, and proper amounts of a fluorescent brightener, a blue dye and a red dye were added to 100 parts by weight of the above pulp, to prepare a paper material slurry. Then, part of the paper material slurry was placed on a Fourdriner paper machine running at a speed of 200 m/minute to form a single layer, and the remaining paper material slurry was placed on a Fourdriner paper machine running at a speed of 200 m/minute to form two layers at two levels of an upper and lower layer balance, and webs were formed with applying proper turbulence. In a wet part, each web was subjected to three-stage wet press at a linear pressure adjusted in the range of 15 to 100 kgf/cm, and then treated with a smoothing roll. In a subsequent drying part, each web was subjected to two-stage bulk density increasing press at a linear pressure adjusted in the range of 30 to 70 kgf/cm and then dried. Then, during the drying, a size press solution containing 4 parts by weight of carboxy-modified polyvinyl alcohol, 0.05 part by weight of a fluorescent brightener, 0.002 part by weight of a blue dye, 4 parts by weight of sodium chloride and 92 parts by weight of water was used for size-pressing at a speed of 25 g/cm$^2$, and the webs were dried such that the base papers to be finally obtained had a water content of 8% by weight in terms of an absolute dry water content. The webs were machine-calendered at a linear pressure of 70 kgf/cm to obtain three kinds of base paper for supports for imaging materials, these kinds of the base paper having a basis weight of 170 g/m$^2$, a density of 1.04 g/cm$^3$ and a film thickness non-uniformity index Rpy as shown in Table 1.

The surface (reverse surface) of each base paper, opposite to the surface where an image-forming layer was to be formed, was subjected to corona discharge treatment, and then, the following resin composition (R1) was coated on the reverse surface of each base paper to form a resin layer having a thickness of 20 μm by melt extrusion coating at a resin temperature of 315° C. at a base paper running speed of 200 m/minute. In this case, there was used a cooling roll having a surface roughness such that the surface of a back layer to be formed had a central plane average roughness SRa of 1.15 μm. The used cooling roll had been surface-roughened by a liquid honing method, and was operated at a cooling water temperature of 12° C.

(Resin Composition R1)

A compounded resin composition prepared by pre-melting and pre-mixing 70 parts by weight of a high-density polyethylene resin (density 0.967 g/cm$^3$, MFR=5 g/10 minutes) and 30 parts by weight of a low-density polyethylene resin (density 0.924 g/cm$^3$, MFT=0.6 g/10 minutes) with a melt extruder, which was used in the form of pellets.

The front surface of each of three kinds of the base paper was subjected to corona discharge treatment, and then, it was coated with a resin composition for a front resin sheet (1), containing 17 parts by weight of a titanium dioxide pigment master batch (to be abbreviated as "master batch (MB-1)" hereinafter) containing 47.5% by weight of a tubular method low-density polyethylene resin (density 0.918 g/cm$^3$, MFR= 8.5 g/10 minutes, melting point 108° C., to be abbreviated as "low-density polyethylene resin (R2) hereinafter), 50% by weight of an anatase type titanium dioxide pigment surface-treated with hydrous aluminum oxide (0.50% by weight, based on titanium dioxide, as an Al$_2$O$_3$ content), 2.5% by weight of zinc stearate and 150 ppm of tetrakis [methylene-3(3,5-di-tert-butyl-4-hydroxyphenyl) propionate]methane as an antioxidant, 8 parts by weight of a titanium dioxide pigment master batch (to be abbreviated as "master batch (MB-2) hereinafter) containing 46.25% by weight a low-density polyethylene resin (R2), 50% by weight of the above titanium dioxide pigment, 1.25% by weight of Ultramarine (#2000, supplied by Dai-ichi Kasei Kogyo K. K.), 2.5% by weight of zinc stearate and 150 ppm of the above antioxidant, 57.6 parts by weight of an autoclave method low-density polyethylene resin (density 0.920 g/cm$^3$, MFR=4.5 g/10 minutes, melting point 109° C., to be abbreviated as "low-density polyethylene resin (R3) hereinafter) and 17.4 parts by weight of a Phillips method high-density polyethylene resin (density 0.967 g/cm$^3$, MFR=7.0 g/10 minutes, melting point 130° C., to be abbreviated as "high-density polyethylene resin (R4) hereinafter), by melt extrusion coating with a melt extruder at a resin temperature of 315° C. at a base paper running speed of 200 m/minute at a linear pressure of 40 kgf/cm between a mirror-surfaced cooling roll and a press roll, to form a layer having a thickness of 28 μm. The melt extrusion coatings of the polyethylene resins on the front surfaces and the reverse surfaces were carried out by a so-called tandem method in which consecutive melt extrusion coatings were carried out. In this case, the surfaces of the resin layers containing the titanium dioxide pigment in the resin-coated paper were produced as glossy surfaces.

Separately, after subjected to corona discharge treatment, the front surface of each of three kinds of the base paper was coated with a front resin sheet (2) in the same manner as in the formation of the front resin sheet (1) except that the same resin composition as that used for the front resin sheet (1), to form a lower layer having a thickness of 14 μm, and the same resin composition as that used for the front resin sheet (1), to form an upper layer having a thickness of 14 μm, were extruded with a two-layer co-extruder by two-layer concurrent extrusion coating at a resin temperature of 315° C. each at a base paper running speed of 200 m/minute at a linear pressure, between a mirror-surfaced cooling roll and a press roll, of 40 kgf/cm.

Separately, further, after subjected to corona discharge treatment, the front surface of each of three kinds of the base paper was coated with a front resin sheet (3) in the same manner as in the formation of the front resin sheet (1) except that the same resin composition as that used for the front resin sheet (1), to form a lower layer having a thickness of 14 μm, and the same resin composition as that used for the front resin sheet (1), to form an upper layer having a thickness of 14 μm, were consecutively extruded with extruders by consecutive melt extrusion coating in different stations in the order of the lower layer and then the upper layer at a resin temperature of 315° C. each at a base paper running speed of 200 m/minute at a linear pressure, between a mirror-surfaced cooling roll and a press roll, of 40 kgf/cm.

Further, after the front and reverse resin sheets were formed and before each resin-coated paper was taken up, the reverse resin sheet of each resin-coated paper was subjected to corona discharge treatment, and then the following back layer coating liquid was applied on machine. That is, a back layer coating liquid containing colloidal silica:styrene-based latex=1:1 and further containing sodium polystyrenesulfonate and a proper amount of a coating aid was applied so as to form a back coating having a sodium polystyrenesulfonate content of 0.021 g/m² as a dry weight and a latex content (as a solid content) of 0.21 g/cm² as a dry weight.

After the back layer was formed and before each resin-coated paper was taken up, the front resin sheet of each resin-coated paper was subjected to corona discharge treatment, an undercoating liquid containing 1.2 g of line-treated gelatin, 0.3 g of low-molecular-weight gelatin (P-3226, supplied by Nitta Gelatin K. K.), 0.3 g of a methanol solution containing 10% by weight of butyl p-hydroxybenzoic acid and 0.45 g of a methanol/water mixture containing 5% by weight of 2-ethylhexyl sulfosuccinate, the total amount of the undercoating liquid being adjusted to 100 g by adding water, was uniformly applied on machine to form an undercoat having a gelatin application amount of 0.06 g/m².

When the supports for imaging materials were produced, the front resin sheet of each support was evaluated for the property of peeling from a cooling roll as follows. When the supports were produced, the irregularity of peeling was visually oversed. Further, the surface state on the front side of each support was observed through light coming askew, to visually determine the degree of occurrence of non-uniformity in peeling. The ratings of the evaluations are as follows (the larger the grade number is, the better the property of peeling is, the smaller the grade number, the poorer the property of peeling is).

Grades 10–9: The peeling from a cooling roll is completely free of irregularity, almost no peeling-caused non-uniformity occurs, and the property of peeling is excellent.

Grades 8–7: The peeling from a cooling roll is almost free of irregularity, peeling-caused non-uniformity slightly occurs, and the property of peeling is good.

Grades 6–5: The peeling from a cooling roll shows slight irregularity, peeling-caused non-uniformity occurs to some extent, while a support has no problem in practical use.

Grades 4–1: The peeling from a cooling roll shows irregularity, peeling-caused non-uniformity occurs to a great extent, and a support has a problem in practical use.

Then, a photographic print having a support for an imaging material was evaluated for gloss appearance by the following method.

A blue-sensitive emulsion layer containing a yellow color forming coupler was formed on the undercoat layer of the support, and an intermediate layer containing a color mixing preventer, a green-sensitive emulsion layer containing a magenta color forming coupler, an ultraviolet absorbent layer containing an ultraviolet absorbent, a red-sensitive emulsion layer containing a cyan color forming coupler and a protective layer were consecutively formed, to obtain a color printing paper having a total gelatin amount of 7 g/m². Each color-sensitive emulsion layer contained silver chlorobromide corresponding to 0.6 g/m² of silver nitrate, gelatin necessary for the formation, dispersion and film formation of silver halide and the formation of a film, proper amounts of a fogging preventer, a sensitizing dye, an application aid, a film curing agent, and a thickener and a proper amount of a filter dye.

Then, the above-obtained color printing paper was stored at 35° C. under constant humidity for 5 days, a group picture (photograph of many people) was printed, subjected to development treatments such as development, bleaching, fixing and stabilization, and then dried to obtain a photographic print. Separately, print samples such as a set-solid white print (not exposed) and a set-solid black print (black color formed) were also prepared. A series of treatments for the exposure, the development and the drying were carried out with an automatic printer and an automatic developing machine. The color formation and development procedures were carried out in the order of color formation and development (45 seconds)→bleaching and fixing (45 seconds) →stabilization (90 seconds)→drying. The so-obtained photographic prints of the universal photograph, the set-solid white print and the set-solid black print were totally evaluated for gloss appearance by 10 people as monitors.

The ratings of evaluation of the gloss appearance are as follows.

⊙: The gloss appearance is very high.

⊙-○: The gloss appearance is considerably high.

○: The gloss appearance is far higher.

○-□: The gloss appearance is high.

□: The gloss appearance is slightly low.

Δ: The gloss appearance is low and there is a problem in practical use.

X: The gloss appearance is very low.

Table 1 shows the results.

TABLE 1

| | Base paper Upper layer/ lower layer thickness ratio | RPy (mV) | Front resin sheet | Peeling property | Gloss appearance |
|---|---|---|---|---|---|
| CEx. 1 | Single layer | 140 | Single layer | 5 | X |
| CEx. 2 | Single layer | 140 | Co-extrusion | 5 | Δ |
| CEx. 3 | Single layer | 140 | Consecutive extrusion | 9 | Δ |
| CEx. 4 | 25/75 | 135 | Single layer | 5 | Δ |
| Ex. 1 | 25/75 | 135 | Co-extrusion | 7 | □ |
| Ex. 2 | 25/75 | 135 | Consecutive extrusion | 9 | ○-□ |
| CEx. 5 | 50/50 | 135 | Single layer | 5 | Δ |
| Ex. 3 | 50/50 | 135 | Co-extrusion | 7 | ○-□ |
| Ex. 4 | 50/50 | 135 | Consecutive extrusion | 8 | ○ |

Ex. = Example, CEx. = Comparative Example

The results in Table 1 show that the supports (Examples 1 to 4) of the present invention obtained by making two-layered paper from a broad-leaved tree pulp and coating the surface with a two-layered resin by co-extrusion or consecutive extrusion are excellent supports which give photographic prints having high gloss appearance and are excellent in the property of peeling and free of the occurrence of peeling non-uniformity.

On the other hand, the supports (Comparative Examples 1 to 5) out of the scope of the present invention, of which the base paper, the front resin sheet or both has or have a mono-layered structure, give photographic prints having low gloss appearance, and involve a problem.

EXAMPLES 5–8 AND COMPARATIVE EXAMPLES 6–10

Examples 1 to 4 and Comparative Examples 1 to 5 were repeated except that the broad-leaved tree bleached kraft pulp was replaced with a broad-leaved tree bleached sulfite pulp. Table 2 shows the results.

TABLE 2

| Base paper Upper layer/ lower layer thickness ratio | RPy (mV) | Front resin sheet | Peeling property | Gloss appearance |
|---|---|---|---|---|
| CEx. 6 | Single layer | 135 | Single layer | 5 | Δ |
| CEx. 7 | Single layer | 135 | Co-extrusion | 5 | Δ |
| CEx. 8 | Single layer | 135 | Consecutive extrusion | 8 | Δ |
| CEx. 9 | 25/75 | 130 | Single layer | 5 | Δ |
| Ex. 5 | 25/75 | 130 | Co-extrusion | 7 | ○-□ |
| Ex. 6 | 25/75 | 130 | Consecutive extrusion | 8 | ○ |
| CEx. 10 | 50/50 | 130 | Single layer | 5 | Δ |
| Ex. 7 | 50/50 | 130 | Co-extrusion | 7 | ○-□ |
| Ex. 8 | 50/50 | 130 | Consecutive extrusion | 9 | ○ |

Ex. = Example, CEx. = Comparative Example

The results in Table 2 show that the supports of which the base paper and the front resin sheet are formed to have a two-layered structure in Examples of the present invention are also excellent supports for imaging materials when a broad-leaved tree bleached sulfite pulp is used.

EXAMPLES 9–12 AND COMPARATIVE EXAMPLES 11–15

Examples 5 to 8 and Comparative Examples 6 to 10 were repeated except that the average fiber length of the broad-leaved bleached sulfite pulp was changed to 1.0 mm. Table 3 shows the results.

TABLE 3

| Base paper Upper layer/ lower layer thickness ratio | RPy (mV) | Front resin sheet | Peeling property | Gloss appearance |
|---|---|---|---|---|
| CEx. 11 | Single layer | 170 | Single layer | 5 | X |
| CEx. 12 | Single layer | 170 | Co-extrusion | 7 | X |
| CEx. 13 | Single layer | 170 | Consecutive extrusion | 9 | X |
| CEx. 14 | 25/75 | 168 | Single layer | 6 | X |
| Ex. 9 | 25/75 | 168 | Co-extrusion | 7 | □ |
| Ex. 10 | 25/75 | 168 | Consecutive extrusion | 9 | □ |
| CEx. 15 | 50/50 | 167 | Single layer | 6 | X |
| Ex. 11 | 50/50 | 167 | Co-extrusion | 7 | □ |
| Ex. 12 | 50/50 | 167 | Consecutive extrusion | 9 | □ |

Ex. = Example, CEx. = Comparative Example

The results in Table 3 show that the gloss appearance when a pulp having an average fiber length of 1.0 mm is used is poor as compared with the gloss appearance when a pulp having an average fiber length of 0.6 mm is used, but that the gloss appearance when the base paper and the front resin sheet are formed to have a two-layered structure each is higher than the gloss appearance when the base paper or the front resin sheet are not so formed or neither of them are so formed.

EXAMPLES 13–18

Examples 5 and 6 were repeated except that the average fiber length of the pulp was changed to 0.4 mm, 0.5 mm or 0.8 mm. Table 4 shows the results.

Photographic materials were evaluated for stiffness as follows. A 13 cm×13 cm color photographic print was evaluated by 10 people as monitors. The color photographic print was manually held and shaken up and down to evaluate the strength of stiffness on the basis of manual feeling. The ratings of the evaluation are as follows. ○: The stiffness is strong. □: The stiffness is strong to some extent. Δ: The stiffness is weak to some extent, but a photographic material is acceptable in practical use. X: The stiffness is weak and there is a problem in practical use.

TABLE 4

| | Fiber length (mm) | RPy (mV) | Front resin sheet | Peeling property | Gloss appearance | Stiffness |
|---|---|---|---|---|---|---|
| Ex. 13 | 0.4 | 110 | Co-extrusion | 5 | ⊙-○ | Δ |
| Ex. 14 | 0.5 | 120 | Co-extrusion | 6 | ○ | □ |
| Ex. 5 | 0.6 | 130 | Co-extrusion | 7 | ○-□ | ○-□ |
| Ex. 15 | 0.8 | 150 | Co-extrusion | 8 | □ | ○ |
| Ex. 16 | 0.4 | 110 | Consecutive extrusion | 6 | ⊙-○ | Δ |
| Ex. 17 | 0.5 | 120 | Consecutive extrusion | 7 | ⊙-○ | □ |
| Ex. 6 | 0.6 | 130 | Consecutive extrusion | 8 | ○ | ○-□ |
| Ex. 18 | 0.8 | 150 | Consecutive extrusion | 9 | ○-□ | ○ |

Ex. = Example

The results in Table 4 show that with an increase in the average fiber length of a pulp, higher gloss appearance is obtained but that the strength of stiffness decreases.

EXAMPLES 19 TO 27

Example 5 was repeated except that the fiber length of pulp of the upper layer of the base sheet and the finish thickness of the upper layer were changed as shown in Table 5. Table 5 shows the results.

TABLE 5

| | Thickness of upper layer of paper (μm) | Fiber length of upper layer of paper (mm) | Rpy (mV) | Peeling property | Gloss appearance |
|---|---|---|---|---|---|
| Ex. 19 | 10 | 0.3 | 123 | 5 | ○ |
| Ex. 20 | 10 | 0.4 | 125 | 5 | ○-□ |
| Ex. 21 | 10 | 0.5 | 128 | 6 | ○-□ |
| Ex. 22 | 30 | 0.3 | 115 | 6 | ⊙-○ |
| Ex. 23 | 30 | 0.4 | 120 | 7 | ○ |
| Ex. 24 | 30 | 0.5 | 125 | 7 | ○-□ |
| Ex. 25 | 50 | 0.3 | 105 | 6 | ⊙-○ |
| Ex. 26 | 50 | 0.4 | 110 | 6 | ⊙-○ |
| Ex. 27 | 50 | 0.5 | 115 | 7 | ○ |

Ex. = Example

The results in Table 5 show the following. When front resin sheets are structured to have two layers by co-extrusion, the smaller the average fiber length of pulp of that layer of the base paper which is adjacent to the front resin sheet is, the higher the gloss appearance is. The gloss appearance when the thickness of the layer adjacent to the front resin sheet is 30 μm is higher than the gloss appearance when the thickness of the layer adjacent to the front resin sheet is 10 μm, and further, the gloss appearance when the thickness of the layer adjacent to the front resin sheet is 50 μm is higher than the gloss appearance when the thickness of the layer adjacent to the front resin sheet is 30 μm.

EXAMPLES 28–36

Example 6 was repeated except that the fiber length of pulp of the upper layer of the base sheet and the finish thickness of the upper layer were changed as shown in Table 6. Table 6 shows the results.

TABLE 6

|  | Thickness of upper layer of paper (μm) | Fiber length of upper layer of paper (mm) | Rpy (mV) | Peeling property | Gloss appearance |
|---|---|---|---|---|---|
| Ex. 28 | 10 | 0.3 | 123 | 6 | ⊙–○ |
| Ex. 29 | 10 | 0.4 | 125 | 6 | ○ |
| Ex. 30 | 10 | 0.5 | 128 | 7 | ○ |
| Ex. 31 | 30 | 0.3 | 115 | 7 | ⊙–○ |
| Ex. 32 | 30 | 0.4 | 120 | 8 | ⊙–○ |
| Ex. 33 | 30 | 0.5 | 125 | 8 | ○ |
| Ex. 34 | 50 | 0.3 | 105 | 7 | ⊙ |
| Ex. 35 | 50 | 0.4 | 110 | 7 | ⊙ |
| Ex. 36 | 50 | 0.5 | 115 | 8 | ⊙–○ |

Ex. = Example

The results in Table 6 also show the following. When front resin sheets are structured to have two layers by consecutive extrusion, the smaller the average fiber length of pulp of that layer of the base paper which is adjacent to the front resin sheet is, the higher the gloss appearance is. The gloss appearance when the thickness of the layer adjacent to the front resin sheet is 30 μm is higher than the gloss appearance when the thickness of the layer adjacent to the front resin sheet is 10 μm, and further, the gloss appearance when the thickness of the layer adjacent to the front resin sheet is 50 μm is higher than the gloss appearance when the thickness of the layer adjacent to the front resin sheet is 30 μm.

EXAMPLES 37–40

Examples 6 was repeated except that the resin temperatures of the resin compositions for the upper layer and the lower layer were set as shown in Table 7 when the front resin sheets (3) were formed by consecutive melt extrusion coating. Table 7 shows the results.

TABLE 7

|  | Resin temperature (° C.) | | Peeling property | Gloss appearance |
|---|---|---|---|---|
|  | Lower layer | Upper layer | | |
| Example 37 | 315 | 315 | 8 | ⊙ |
| Example 38 | 315 | 310 | 9 | ⊙ |
| Example 39 | 315 | 300 | 10 | ⊙ |
| Example 40 | 310 | 310 | 9 | ⊙ |

The results in Table 7 show the following. In the present invention, when the resin compositions for the front resin sheet having a multi-layered structure are extruded for melt extrusion coating, it is preferred, in view of the effect on improvement in the property of peeling, to set the temperature of the resin composition for the upper most layer at a lower temperature than the temperature of the resin composition for the resin layer under the uppermost layer.

EXAMPLES 41 TO 45

Example 6 was repeated except that the coating thickness of the upper layer and the coating thickness of the lower layer of the front resin sheet (3) were changed as shown in Table 8. Table 8 shows the results.

TABLE 8

|  | Coating thickness of resin layer | | Peeling property | Gloss appearance |
|---|---|---|---|---|
|  | Lower layer | Upper layer | | |
| Example 41 | 6 | 22 | 6 | □ |
| Example 42 | 7.5 | 20.5 | 6 | ○ |
| Example 43 | 11 | 17 | 7 | ⊙–○ |
| Example 44 | 14 | 14 | 7 | ⊙ |
| Example 45 | 21 | 7 | 8 | ⊙–○ |

The results in Table 8 show the following. Of the supports for imaging materials in the present invention, of which the front resin sheets are constituted to have a multi-layered structure, in view of the effect on improvements in the gloss appearance of a photographic print and the property of peeling, the thickness of the resin layer composed of at least the lowermost layer is preferably at least 25%, more preferably at least 39%, particularly preferably at least 50%, of the total thickness of the resin layers.

EXAMPLES 46–52

Example 6 was repeated except that the resin composition for the upper layer and the lower layer was replaced with the following resin compositions (6UA) to (6UD) and (6LE) to (6LG) in a combination shown in Table 9.

Resin compositions for upper layer: (6UA)-(6UD)

Resin composition (6UA): Resin composition containing 17 parts by weight of master batch (MB-1) used in Example 6, 8 parts by weight of master batch (MB-2) used in Example 6 and 75 parts by weight a low-density polyethylene resin (R3) which was the same as that used in Example 6.

Resin composition (6UB): The same resin composition for an upper layer, as that used in Example 6 (content of high-density polyethylene based on the total resin components for upper layer: 20.1% by weight).

Resin composition (6UC): Resin composition containing 17 parts by weight of master batch (MB-1), 8 parts by weight of master batch (MB-2), 40.2 parts by weight of low-density polyethylene resin (R3) and 34.8 parts by weight (corresponding to 40.1% by weight based on the total resin components for upper layer) of high-density polyethylene resin (R4).

Resin composition (6UD): Resin composition containing 21 parts by weight of master batch (MB-1), 9 parts by weight of master batch (MB-2), 53.1 parts by weight of low-density polyethylene resin (R3) and 16.9 parts by weight (corresponding to 20.1% by weight based on the total resin components for upper layer) of high-density polyethylene resin (R4).

Resin compositions for lower layer: (6LE)–(6LG)

Resin composition (6LE): The same composition for a lower layer as that used in Example 6.

Resin composition (6LF): Autoclave-method low-density polyethylene resin having a density of 0.924 g/cm$^3$, an MFR of 4.5 g/10 minutes and a melting point of 111° C.

Resin composition (6LG): Tubular-method low-density polyethylene resin having a density of 0.924 g/cm$^3$, an MFR of 3.0 g/10 minutes and a melting point of 111° C.

Table 9 shows the results.

TABLE 9

| | Resin compositions | | Peeling | Gloss |
|---|---|---|---|---|
| | Lower layer | Upper layer | Property | appearance |
| Example 46 | (6LE) | (6UA) | 8 | ◎-○ |
| Example 47 | (6LE) | (6UB) | 9 | ◎ |
| Example 48 | (6LE) | (6UC) | 10 | ◎ |
| Example 49 | (6LE) | (6UD) | 9 | ◎ |
| Example 50 | (6LF) | (6UD) | 9 | ◎ |
| Example 51 | (2LG) | (6UD) | 9 | ◎ |
| Example 52 | (6LG) | (6UB) | 9 | ◎ |

The results in Table 9 show the following. Of the supports for imaging materials in the present invention, of which the front resin sheet is constituted to have a multi-layered structure by consecutive extrusion, the support having the uppermost layer containing at least one resin having a higher density or melting point than the resin of the resin layer under it is preferred in view of the effect on improvements in the gloss appearance of a photographic print and the property of peeling. Further, even if the contents of additives such as a titanium dioxide pigment, a colorant pigment, a releasing agent and an antioxidant in the layer below the uppermost layer are smaller than the contents thereof in the uppermost layer, it does not affect the effects of the present invention and is advantageous in economic performance.

EXAMPLES 53–59

Example 5 was repeated except that the resin composition for the upper layer and the lower layer was replaced with the following resin compositions (5UA) to (5UD) and (5LE) to (5LG) in a combination shown in Table 10. The (5UA) to (5UD) and (5LE) to (5LG) were substantially the same as the (6UA) to (6UD) and (6LE) to (6LG) except that the consecutive extrusion was replaced with co-extrusion. Table 10 shows the results.

TABLE 10

| | Resin compositions | | Peeling | Gloss |
|---|---|---|---|---|
| | Lower layer | Upper layer | Property | appearance |
| Example 53 | (5LE) | (5UA) | 5 | □-△ |
| Example 54 | (5LE) | (5UB) | 6 | ○-□ |
| Example 55 | (5LE) | (5UC) | 7 | ◎-○ |
| Example 56 | (5LE) | (5UD) | 6 | ○ |
| Example 57 | (5LF) | (5UD) | 6 | ○-□ |
| Example 58 | (5LG) | (5UD) | 6 | ○-□ |
| Example 59 | (5LG) | (5UB) | 6 | ○-□ |

The results in Table 10 show the following. Even when the front resin sheet is formed by co-extrusion in the support for an imaging material, of which the front resin sheet is constituted to have a multi-layered structure, the support having the uppermost layer containing at least one resin having a higher density or melting point than the resin of the resin layer under it is preferred in view of the effect on improvements in the gloss appearance of a photographic print and the property of peeling. Further, even if the contents of additives such as a titanium dioxide pigment, a colorant pigment, a releasing agent and an antioxidant in the layer below the uppermost layer are smaller than the contents thereof in the uppermost layer, it does not affect the effects of the present invention and is advantageous in economic performance.

EXAMPLES 60–62

Example 5 was repeated except that the resin composition for the upper layer and the lower layer of the front resin sheet (2) was replaced with the resin composition (5UD), that the resin composition of the lower layer was replaced with the resin composition (5LF) and that the running speed of the base paper was set as shown in Table 11. Table 11 shows the results.

EXAMPLES 63–65

Example 50 was repeated except that the running speed of the base paper was set as shown in Table 11. Table 11 shows the results.

TABLE 11

| | Running speed of base paper (m/minute) | Peeling property | Gloss appearance |
|---|---|---|---|
| Example 60 | 200 | 7 | ○-□ |
| Example 61 | 250 | 6 | □ |
| Example 62 | 300 | 5 | △ |
| Example 63 | 200 | 9 | ◎ |
| Example 64 | 250 | 8 | ◎ |
| Example 65 | 300 | 7 | ◎ |

The results in Table 11, i.e., the comparison between Example 60 and Example 63 (the running speed of the base paper was 200 m/minute), the comparison between Example 61 and Example 64 (the running speed of the base paper was 250 m/minute), and the comparison between Example 62 and Example 65 (the running speed of the base paper was 300 m/minute) show the following. With an increase in the running speed of the base paper (i.e., with an increase in the speed of production of the support for an imaging material), that is, when the running speed of the base paper is at least 200 m/minute, further, at least 250 m/minute, particularly, at least 300 m/minute, of the supports of the present invention, the support of which the front resin sheet is constituted to have a multi-layered structure by a consecutive melt extrusion coating method is particularly preferred in view of the effects on improvements in the gloss appearance of a photographic print and the property of peeling. Further, the above support for an imaging material can give an imaging material and a print thereon which have a high gloss appearance, and it is an excellent support for an imaging material, which support is free from the occurrence of peeling non-uniformity and can be stably produced at a high speed.

EXAMPLE 66

The following ink receiving layer was formed on the support obtained in Example 6 in place of the multi-layered silver halide color photograph constituting layer, to prepare an inkjet recording material. As a result, the inkjet recording material had a high-gloss appearance and was free of non-uniformity in gloss, and the above support was therefore excellent.

The ink receiving layer was formed by applying a coating solution containing 30 g of an aqueous solution containing 10% by weight of an alkali-treated gelatin having a molecular weight of 70,000, 37.5 g of an aqueous solution containing 8% by weight of sodium carboxymethyl cellulose (etherification degree 0.7–0.8, viscosity of 2 wt % aqueous solution measured with Brookfield viscometer 5 cp or less), 0.3 g of a methanol solution containing 5% by weight of an epoxy compound (NER-010, supplied by Nagase sangyo K. K.), 0.5 g of a methanol/water mixture containing 5% by weight of 2-ethylhexyl sulfosuccinate and 31.7 g of purified water, and the ink receiving layer had a solid content of 7 g/cm².

EXAMPLES 67–73 AND COMPARATIVE EXAMPLES 16–23

A broad-leaved tree bleached pulp was adjusted to a concentration of 4% by weight in terms of an absolute dry weight and beaten so as to have an average fiber length of 0.4 mm and a Canadian Standard freeness of 350 ml. The obtained pulp was used as a pulp for an upper layer (layer adjacent to a resin sheet on a side where an image is to be formed) of a three-layered paper. Similarly, a broad-leaved tree bleached sulfite pulp was beaten to have an average fiber length of 0.8 mm and a Canadian standard freeness of 350 mm, and the obtained pulp was used as a pulp for an intermediate layer. Further, a pulp mixture containing 90% by weight of a broad-leaved tree kraft pulp and 10% by weight of a broad-leaved tree sulfite pulp was beaten to have an average fiber length of 0.6 mm and a Canadian standard freeness of 350 mm, and the obtained pulp was used as a pulp for a lower layer. After the beating, 3 parts by weight of cationized starch, 0.2 part by weight of anionized polyacrylamide, 0.4 part by weight (as a ketene dimer content) of an alkylketene dimer emulsion, 0.4 part by weight of a polyamide epichlorohydrin resin and proper amounts of a fluorescent brightener, a blue dye and a red dye were added to 100 parts by weight of each pulp to prepare paper material slurries. Then, the paper material slurries were placed on a Fourdriner paper machine running at a speed of 200 m/minute to form three layers (partly, two layers) at varied levels of an upper, intermediate and lower layer balance as shown in Table 12, and a web was formed with applying proper turbulence. In a wet part, the web was subjected to three-stage wet press at a linear pressure adjusted in the range of 15 to 100 kgf/cm. Then, the web was treated with a smoothing roll. In a subsequent drying part, the web was subjected to two-stage bulk density increasing press at a linear pressure adjusted in the range of 30 to 70 kgf/cm and then dried. Then, during the drying, a size press solution containing 4 parts by weight of carboxy-modified polyvinyl alcohol, 0.05 part by weight of a fluorescent brightener, 0.002 part by weight of a blue dye, 4 parts by weight of sodium chloride and 92 parts by weight of water was size-pressed at a speed of 25 g/cm, and the web was dried such that the base paper to be finally obtained had a water content of 8% by weight in terms of an absolute dry water content. The web was machine-calendered at a linear pressure of 70 kgf/cm to obtain a base paper for a support for an imaging material, the base paper having a basis weight of 170 g/m², a density of 1.04 g/cm³ and a film thickness non-uniformity index Rpy as shown in Table 12.

A base paper for an imaging material was prepared in the same manner as in Example 72 except that the paper material slurry for an upper layer and the paper material slurry for a lower layer in Example 72 were mixed in the a mixing ratio which was the same as the ratio of these slurries in Example 72. The obtained base paper was used as a base paper in Comparative Example 23.

The surface (reverse surface) of each base paper, opposite to the surface where an image-forming layer was to be formed, was subjected to corona discharge treatment, and then, the following resin composition (R1) was coated on the reverse surface of each base paper to form a resin layer having a thickness of 20 μm by melt extrusion coating at a resin temperature of 315° C. at a base paper running speed of 200 m/minute. In this case, there was used a cooling roll having a surface roughness such that the surface of a back layer to be formed had a central plane average roughness SRa of 1.15 μm. The used cooling roll had been surface-roughened by a liquid honing method, and was operated at a cooling water temperature of 12° C. (Resin composition R1)

A compounded resin composition prepared by pre-melting and pre-mixing 70 parts by weight of a high-density polyethylene resin (density 0.967 g/cm³, MFR=5 g/10 minutes) and 30 parts by weight of a low-density polyethylene resin (density 0.924 g/cm³, MFT=0.6 g/10 minutes) with a melt extruder, which was used in the form of pellets.

The front surface of the base paper was subjected to corona discharge treatment, and then, it was coated with a resin composition for a front resin sheet (1), containing 17 parts by weight of the same titanium dioxide pigment master batch as the master batch (MB-1) used in Examples 1 to 4, 8 parts by weight of the same titanium dioxide pigment master batch as the master batch (MB-2) used in Examples 1 to 4, 57.6 parts by weight of the same autoclave-method low-density polythylene resin as the low-density polyethylene resin (R3) used in Examples 1 to 3 and 17.4 parts by weight of the same Phillips method high-density polyethylene resin as the high-density polyethylene resin (R4) used in Examples 1 to 4, by melt extrusion coating with a melt extruder at a resin temperature of 315° C. at a base paper running speed of 200 m/minute at a linear pressure of 40 kgf/cm between a mirror-surfaced cooling roll and a press roll, to form a layer having a thickness of 28 μm. The melt extrusion coatings of the polyethylene resins on the front surface and the reverse surface were carried out by a so-called tandem method in which consecutive melt extrusion coatings were carried out. In this case, the surface of the resin layer containing the titanium dioxide pigment in the resin-coated paper was produced as a glossy surface.

Further, after the front and reverse resin sheets were formed and before the resin-coated paper was taken up, the reverse resin sheet of the resin-coated paper was subjected to corona discharge treatment, and then the following back layer coating liquid was applied on machine. That is, a back layer coating liquid containing colloidal silica:styrene-based latex =1:1 and further containing sodium polystyrene-sulfonate and a proper amount of a coating aid was applied so as to form a back layer having a sodium polystyrene-sulfonate content of 0.021 g/m² as a dry weight and a latex content (as a solid content) of 0.21 g/cm² as a dry weight.

After the back layer was formed and before the resin-coated paper was taken up, the front resin sheet of the resin-coated paper was subjected to corona discharge treatment, an undercoating liquid containing 1.2 g of lime-treated gelatin, 0.3 g of low-molecular-weight gelatin (P-3226, supplied by Nitta Gelatin K. K.), 0.3 g of a methanol solution containing 10% by weight of butyl p-hydroxybenzoic acid and 0.45 g of a methanol/water mixture containing 5% by weight of 2-ethylhexyl sulfosuccinate, the total amount of the undercoating liquid being adjusted to 100 g by adding water, was uniformly applied on machine to form an undercoat having a gelatin application amount of 0.06 g/m².

A photographic print having the support for an imaging material was evaluated in the same manner as in Examples 1 to 4 and comparative Examples 1~5.

For the evaluation of stiffness, an imaging material was evaluated for stiffness as follows. A 13 cm×18 cm color photographic print was evaluated by 10 people as monitors. The color photographic print was manually held and shaken up and down to evaluate the strength of stiffness on the basis of manual feeling.

The ratings of the evaluation are as follows.

⊙: The stiffness is very strong.

o: The stiffness is strong.

□: The stiffness is weak to some extent, but an imaging material is acceptable in practical use.

X: The stiffness is weak and floppy, and there is a problem in practical use.

Table 12 shows the results.

TABLE 12

| | Structure of base paper [Thickness ratio (%)] | | | Rpy (mV) | Stiffness | Gloss appearance |
|---|---|---|---|---|---|---|
| | Upper layer | Intermediate layer | Lower layer | | | |
| CEx. 16 | 5 | 35 | 60 | 138 | ○ | X |
| CEx. 17 | 5 | 25 | 70 | 135 | ○ | X |
| CEx. 18 | 10 | 40 | 50 | 133 | X | Δ |
| CEx. 19 | 20 | 30 | 50 | 129 | X | □ |
| CEx. 20 | 30 | 20 | 50 | 120 | X | ○ |
| CEx. 21 | 40 | 10 | 50 | 97 | X | ○ |
| CEx. 22 | 50 | — | 50 | 96 | X | ○ |
| Ex. 67 | 10 | 30 | 60 | 131 | ○ | □ |
| Ex. 68 | 10 | 20 | 70 | 128 | ○ | □-○ |
| Ex. 69 | 20 | 20 | 60 | 125 | □ | ○ |
| Ex. 70 | 20 | 10 | 70 | 123 | ○ | ○ |
| Ex. 71 | 30 | 10 | 60 | 115 | □ | ○ |
| Ex. 72 | 30 | — | 70 | 112 | ○ | ○ |
| Ex. 73 | 40 | — | 60 | 108 | □ | ⊙ |
| CEx. 23 | Single layer of mixture of compositions used for upper and lower layers in Example 72 | | | 141 | ○ | X |

The results in Table 12 show the following. The photographic prints having the base paper having a smaller content of a short fiber pulp in Comparative Examples 16 and 17 exhibit insufficient gloss appearance. On the other hand, the photographic prints having the base paper of which the lower layer has a smaller thickness exhibit insufficient stiffness. In contrast, the photographic prints in Examples 67 to 73 of the present invention are well-balanced between the gloss appearance and the stiffness. Further, the photographic print in Comparative Example 23, which has the single-layered base paper formed of a mixture of the pulps for the upper and lower layers in Example 72, exhibits insufficient gloss appearance.

EXAMPLES 74–85

Example 71 was repeated except that the fiber length of the pulp for the upper layer and the thickness of the upper layer were changed as shown in Table 13. Table 13 shows the results.

TABLE 13

| | Fiber length of pulp for upper layer | Structure of base paper [Thickness ratio (%)] | | | Rpy (mV) | Stiffness | gloss appearance |
|---|---|---|---|---|---|---|---|
| | | Upper layer | Intermediate layer | Lower layer | | | |
| Ex. 74 | 0.3 mm | 10 | 30 | 60 | 132 | ○ | ○ |
| Ex. 75 | " | 20 | 20 | " | 123 | □-○ | ○-⊙ |
| Ex. 76 | " | 30 | 10 | " | 114 | □-○ | ⊙ |
| Ex. 77 | " | 40 | — | " | 105 | □ | ⊙ |
| Ex. 78 | 0.4 mm | 10 | 30 | " | 131 | ○ | □ |
| Ex. 79 | " | 20 | 20 | " | 127 | ○ | ○ |
| Ex. 80 | " | 30 | 10 | " | 117 | ○ | ○ |
| Ex. 81 | " | 40 | — | " | 110 | □ | ⊙ |
| Ex. 82 | 0.5 mm | 10 | 30 | " | 138 | ○ | □ |
| Ex. 83 | " | 20 | 20 | " | 130 | ○ | ○ |
| Ex. 84 | " | 30 | 10 | " | 122 | ○ | ○ |
| Ex. 85 | " | 40 | — | " | 115 | □-○ | ○ |

Ex. = Example

Table 13 shows the following. The smaller the average fiber length is, the higher the gloss appearance is, and the larger the average fiber length is, the higher the stiffness is. The larger the thickness of the upper layer is, the higher the gloss appearance is, and the smaller the thickness of the upper layer is, the higher the stiffness is. When the thickness of the upper layer is in the range of 20 to 30% within the scope of the present invention, the gloss appearance and the stiffness are particularly well-balanced.

EXAMPLES 86–97

Example 71 was repeated except that the fiber length of the pulp for the lower layer and the thickness of the lower layer were changed as shown in Table 14. Table 14 shows the results.

TABLE 14

| | Structure of base paper [Thickness ratio (%)] | | | Pulp for lower layer | | Rpy (mV) | Stiffness | Gloss-appearance |
|---|---|---|---|---|---|---|---|---|
| | Upper layer | Intermediate layer | Lower layer | Fiber length | Broad-leaved tree kraft pulp (wt %) | | | |
| Ex. 86 | 30 | 10 | 60 | 0.5 mm | 80 | 115 | □ | ○ |
| Ex. 87 | " | — | 70 | " | " | 114 | □ | ○ |
| Ex. 88 | " | 10 | 60 | 0.65 mm | " | 117 | □ | ○ |
| Ex. 89 | " | — | 70 | " | " | 115 | ○ | ○ |
| Ex. 90 | " | 10 | 60 | 0.8 mm | " | 119 | ○ | ○ |
| Ex. 91 | " | — | 70 | " | " | 118 | ○ | ○ |
| Ex. 92 | " | 10 | 60 | 0.5 mm | 100 | 114 | □ | ○ |
| Ex. 93 | " | — | 70 | " | " | 118 | ○ | ○ |

TABLE 14-continued

|  | Structure of base paper [Thickness ratio (%)] | | | Pulp for lower layer | | | | |
|---|---|---|---|---|---|---|---|---|
|  | Upper layer | Intermediate layer | Lower layer | Fiber length | Broad-leaved tree kraft pulp (wt %) | Rpy (mV) | Stiffness | Gloss-appearance |
| Ex. 94 | " | 10 | 60 | 0.65 mm | " | 115 | ○ | ○ |
| Ex. 95 | " | — | 70 | " | " | 113 | ○ | ○ |
| Ex. 96 | " | 10 | 60 | 0.8 mm | " | 118 | ○ | ○ |
| Ex. 97 | " | — | 70 | " | " | 116 | ○ | ○ |

Table 14 shows that the larger the fiber length of the lower layer is, the more advantageous the larger fiber length is for the stiffness, and that when the fiber length of the lower layer is in the above range, there is no particular problem on the gloss appearance.

EXAMPLES 98–100

Example 72 was repeated except that the average fiber length of the pulps for the upper and lower layers, the content of the broad-leaved tree kraft pulp in the pulp for the lower layer, the kinds of the pulps for the upper layer and the kinds of the rest of the pulps for the lower layer were as shown in Table 15. Table 15 shows the results.

the stiffness is insufficient. In Comparative Example 28 in which the average fiber length of the pulp in the lower layer is too large, the gloss appearance is insufficient. In Comparative Examples 32 and 33 in which the content of the broad-leaved kraft pulp in the lower layer is small but the rest of the pulp is a conifer pulp, the stiffness is high, while the gloss appearance is insufficient. In contrast, in Examples 98, 99 and 100 of the present invention, the gloss appearance and the stiffness are both satisfactory.

EXAMPLES 101 AND 102

In Example 101, Example 72 was repeated except that the intermediate layer was arranged to be positioned between

TABLE 15

|  | Pulp constitution | | | | | | | |
|---|---|---|---|---|---|---|---|---|
|  | Upper layer | | Lower layer | | | | | |
|  | Fiber length | kind | Fiber length | LK (wt %) | The Rest of pulp | Rpy (mV) | Stiffness | Gloss appearance |
| Ex. 72 | 0.4 mm | LK | 0.6 mm | 90 | LS | 114 | ○ | ○ |
| CEx. 24 | 0.6 mm | LK | 0.6 mm | 90 | LS | 135 | ⊙ | X |
| CEx. 25 | 0.2 mm | LK | 0.6 mm | 90 | LS | 100 | X | ⊙ |
| CEx. 26 | 0.4 mm | LK | 0.6 mm | 70 | LS | 112 | X | ○ |
| Ex. 98 | 0.4 mm | LK | 0.6 mm | 80 | LS | 113 | ○ | ○ |
| CEx. 27 | 0.4 mm | LK | 0.45 mm | 90 | LS | 111 | X | ○–⊙ |
| CEx. 28 | 0.4 mm | LK | 0.9 mm | 90 | LS | 125 | ⊙ | X |
| CEx. 29 | 0.4 mm | LS | 0.6 mm | 90 | LS | 109 | X | ○ |
| CEx. 30 | 0.4 mm | NS | 0.6 mm | 90 | LS | 125 | ⊙ | Δ |
| CEx. 31 | 0.4 mm | NK | 0.6 mm | 90 | LS | 129 | ⊙ | X |
| CEx. 32 | 0.4 mm | LK | 0.6 mm | 70 | NS | 125 | ⊙ | Δ |
| CEx. 33 | 0.4 mm | LK | 0.6 mm | 70 | NK | 130 | ⊙ | X |
| Ex. 99 | 0.4 mm | LK | 0.6 mm | 90 | NS | 118 | ⊙ | ○ |
| Ex. 100 | 0.4 mm | LK | 0.6 mm | 90 | NK | 120 | ⊙ | ○ |

Ex. = Example, CEx. = Comparative Example

In Table 15, LK stands for broad-leaved tree kradt pulp, LS stands for broad-leaved tree sulfite pulp, NK stands for conifer kraft pulp, and NS stands for conifer sulfite pulp. "The rest of pulp" stands for pulp other than broad-leaved tree kraft pulp in the pulp for a lower layer.

Table 15 shows the following. In Comparative Example 24 in which the average fiber length of the pulp in the upper layer is large and Comparative Examples 30 and 31 in which the conifer pulp is used in the upper layer, the gloss appearance is insufficient. In Comparative Example 25 in which the average fiber length of the pulp in the upper layer is small and Comparative Example 29 in which the pulp in the upper layer is a broad-leaved sulfite pulp, the stiffness is insufficient. On the other hand, in Comparative Example in which the content of the broad-leaved kraft pulp in the lower layer is small and Comparative Example 27 in which the average fiber length of the pulp in the lower layer is small, two equal divisions of the lower layer to make a four-layered paper. In Example 102, Example 70 was repeated except that the pulp for the intermediate layer and the pulp for the lower layer were mixed in the same amount ratio to make a two-layered paper. Table 16 shows the results.

TABLE 16

|  | Structure of base paper [Thickness ratio (%)] | | | Rpy (mV) | Clark stiffness | Gloss appearance |
|---|---|---|---|---|---|---|
| Ex. 72 | Upper layer 30 | Intermediate layer 10 | Lower layer 60 | 112 | ○ | ○ |
| Ex. 101 | Upper layer | Lower layer 1 | Inter-mediate | Lower layer 2 | 112 | □ | ○ |

TABLE 16-continued

|  | Structure of base paper [Thickness ratio (%)] | | | Rpy (mV) | Clark stiffness | Gloss appearance |
|---|---|---|---|---|---|---|
| Ex. 70 | 30 Upper layer 20 | 30 layer 10 Intermediate layer 10 | 30 Lower layer 70 | 112 | ○ | ○ |
| Ex. 102 | Upper layer 20 | Lower layer 80 Mixture of pulps for intermediate layer and lower layer in Example 70 | | 112 | ⊚ | ○ |

Ex. = Example

Table 16 shows the following. In Example 101 in which the layers having an average fiber length of 0.6 mm and containing 90% by weight of a broad-leaved tree kraft pulp does not constitute a continuous layer whose thickness is 60%, the discontinued layers are disadvantageous for the stiffness. In Example 102 in which the base paper is composed of only two layers, i.e., an upper layer composed of a broad-leaved tree kraft pulp having an average fiber length of 0.4 mm and a lower layer composed of a pulp composition having an average fiber length of 0.6 mm and containing at least 80% by weight of a broad-leaved tree kraft pulp, the base paper is advantageous for the stiffness although the pulp composition is the same as that in Example 70.

EXAMPLES 103 AND 104

In Example 103, Example 102 was repeated except that, after the corona discharge treatment of the front surface of the base paper, the above front surface was coated with a front resin sheet (2) in the same manner as in the formation of the front resin sheet (1) except that the same resin composition as that used for the front resin sheet (1), to form a lower resin layer having a thickness of 14 μm, and the same resin composition as that used for the front resin sheet (1), to form an upper resin layer having a thickness of 14 μm, were extruded with a two-layer co-extruder by two-layer concurrent extrusion coating at a resin temperature of 315° C. each at a base paper running speed of 200 m/minute at a linear pressure, between a mirror-surfaced cooling roll and a press roll, of 40 kgf/cm.

In Example 104, Example 102 was repeated except that, after the corona discharge treatment of the front surface of the base paper, the above front surface was coated with a front resin sheet (3) in the same manner as in the formation of the front resin sheet (1) except that the same resin composition as that used for the front resin sheet (1), to form a lower layer having a thickness of 14 μm, and the same resin composition as that used for the front resin sheet (1), to form an upper layer having a thickness of 14 μm, were consecutively extruded with extruders by consecutive melt extrusion coating in different stations in the order of the lower layer and then the upper layer at a resin temperature of 315° C. each at a base paper running speed of 200 m/minute at a linear pressure, between a mirror-surfaced cooling roll and a press roll, of 40 kgf/cm.

The supports for imaging materials were evaluated for the property of peeling from the cooling roll at their production time in the same manner as in Examples 1 to 4.

Table 17 shows the results.

TABLE 17

|  | Resin sheet | Peeling property | Gloss appearance |
|---|---|---|---|
| Example 102 | Single layer | 6 | ○ |
| Example 103 | Co-extrusion | 7 | ○-⊚ |
| Example 104 | Consecutive extrusion | 10 | ⊚ |

The results in Table 17 show that when the resin sheet has a two-layered structure, and further, when it has a two-layered structure produced by consecutive extrusion, the imaging materials are excellent both in the peeling property and the gloss appearance.

EXAMPLES 105–108

Example 104 was repeated except that the temperatures of the resin compositions for the upper and lower layers were set as shown in Table 18 when the front resin sheet (3) was formed by consecutive melt extrusion coating. Table 18 shows the results.

TABLE 18

|  | Resin temperature (° C.) | | Peeling property | Gloss appearance |
|---|---|---|---|---|
|  | Lower layer | Upper layer | | |
| Example 105 | 315 | 315 | 8 | ⊚ |
| Example 106 | 315 | 310 | 9 | ⊚ |
| Example 107 | 315 | 300 | 10 | ⊚ |
| Example 108 | 310 | 310 | 9 | ⊚ |

The results in Table 18 show the following. In the present invention, when the resin compositions for the front resin sheet having a multi-layered structure are extruded for melt extrusion coating, it is preferred, in view of the effect on improvement in the property of peeling, to set the temperature of the resin composition for the upper most layer at a lower temperature than the temperature of the resin composition for the resin layer under the uppermost layer.

EXAMPLES 109–113

Example 104 was repeated except that the coating thickness of the upper layer and the coating thickness of the lower layer of the front resin sheet (3) were changed as shown in Table 19. Table 19 shows the results.

TABLE 19

|  | Coating thickness of resin layer | | Peeling property | Gloss appearance |
|---|---|---|---|---|
|  | Lower layer | Upper layer | | |
| Example 109 | 6 | 22 | 6 | □ |
| Example 110 | 7.5 | 20.5 | 6 | ○ |
| Example 111 | 11 | 17 | 7 | ⊚-○ |
| Example 112 | 14 | 14 | 7 | ⊚ |
| Example 113 | 21 | 7 | 8 | ⊚-○ |

The results in Table 19 show the following. Of the supports for imaging materials in the present invention, of which the front resin sheets are constituted to have a multi-layered structure, in view of the effect on improvements in the gloss appearance of a photographic print and the property of peeling, the thickness of the resin layer composed of at least the lowermost layer is preferably at least 25%, more preferably at least 39%, particularly preferably at least 50%, of the total thickness of the resin layers.

EXAMPLES 114–120

Example 104 was repeated except that the resin composition for the upper layer or the lower layer of the front resin sheet was replaced with the following resin compositions (104UA) to (104UD) and (104LE) to (104LG) in a combination shown in Table 20.

Resin compositions for upper layer: (104UA)-(104UD)

Resin composition (104UA): Resin composition containing 17 parts by weight of master batch (MB-1) used in Example 6, 8 parts by weight of master batch (MB-2) used in Example 6 and 75 parts by weight a low-density polyethylene resin (R3) which was the same as that used in Example 6.

Resin composition (104UB): The same resin composition for an upper layer, as that used in Example 104 (content of high-density polyethylene based on the total resin components for upper layer: 20.1% by weight).

Resin composition (104UC): Resin composition containing 17 parts by weight of master batch (MB-1), 8 parts by weight of master batch (MB-2), 40.2 parts by weight of low-density polyethylene resin (R3) and 34.8 parts by weight (corresponding to 40.1% by weight based on the total resin components for upper layer) of high-density polyethylene resin (R4).

Resin composition (104UD): Resin composition containing 21 parts by weight of master batch (MB-1), 9 parts by weight of master batch (MB-2), 53.1 parts by weight of low-density polyethylene resin (R3) and 16.9 parts by weight (corresponding to 20.1% by weight based on the total resin components for upper layer) of high-density polyethylene resin (R4).

Resin compositions for lower layer: (104LE)-(104LG)

Resin composition (104LE): The same composition for a lower layer as that used in Example 104.

Resin composition (104LF): Autoclave-method low-density polyethylene resin having a density of 0.924 g/cm$^3$, an MFR of 4.5 g/10 minutes and a melting point of 111° C.

Resin composition (104LG): Tubular-method low-density polyethlene resin having a density of 0.924 g/cm$^3$, and MFR of 3.0 g/10 minutes and a melting point of 111° C.

Table 20 shows the results.

TABLE 20

|  | Resin compositions | | Peeling | Gloss |
|---|---|---|---|---|
|  | Lower layer | Upper layer | Property | appearance |
| Example 114 | (104LE) | (104UA) | 8 | ◉-○ |
| Example 115 | (104LE) | (104UB) | 9 | ◉ |
| Example 116 | (104LE) | (104UC) | 10 | ◉ |
| Example 117 | (104LE) | (104UD) | 9 | ◉ |
| Example 118 | (104LF) | (104UD) | 9 | ◉ |
| Example 119 | (104LG) | (104UD) | 9 | ◉ |
| Example 120 | (104LG) | (104UB) | 9 | ◉ |

The results in Table 20 show the following. Of the supports for imaging materials in the present invention, of which the front resin sheet is constituted to have a multi-layered structure by consecutive extrusion, the support having the uppermost layer containing at least one resin having a higher density or melting point than the resin of the resin layer under it is preferred in view of the effect on improvements in the gloss appearance of a photographic print and the property of peeling. Further, even if the contents of additives such as a titanium dioxide pigment, a colorant pigment, a releasing agent and an antioxidant in the layer below the uppermost layer are smaller than the contents thereof in the uppermost layer, it does not affect the effects of the present invention and is advantageous in economic performance.

EXAMPLES 121–127

Example 103 was repeated except that the resin composition for the upper layer or the lower layer was replaced with the following resin compositions (103UA) to (103UD) and (103LE) to (103LG) in a combination shown in Table 21. The (103UA) to (103UD) and (103LE) to (103LG) were substantially the same as the (104UA) to (104UD) and (104LE) to (104LG) except that the consecutive extrusion was replaced with co-extrusion. Table 21 shows the results.

TABLE 21

|  | Resin compositions | | Peeling | Gloss |
|---|---|---|---|---|
|  | Lower layer | Upper layer | Property | appearance |
| Example 121 | (103LE) | (103UA) | 5 | □-△ |
| Example 122 | (103LE) | (103UB) | 6 | ○-□ |
| Example 123 | (103LE) | (103UC) | 7 | ◉-○ |
| Example 124 | (103LE) | (103UD) | 6 | ○ |
| Example 125 | (103LF) | (103UD) | 6 | ○-□ |
| Example 126 | (103LG) | (103UD) | 6 | ○-□ |
| Example 127 | (103LG) | (103UB) | 6 | ○-□ |

The results in Table 21 show the following. Even when the front resin sheet is formed by co-extrusion in the support for an imaging material, of which the front resin sheet is constituted to have a multi-layered structure, the support having the uppermost layer containing at least one resin having a higher density or melting point than the resin of the resin layer under it is preferred in view of the effect on improvements in the gloss appearance of a photographic print and the property of peeling. Further, even if the contents of additives such as a titanium dioxide pigment, a colorant pigment, a releasing agent and an antioxidant in the layer below the uppermost layer are smaller than the contents thereof in the uppermost layer, it does not at all affect the effects of the present invention and is advantageous in economic performance.

EXAMPLES 128–130

Example 103 was repeated except that the resin composition for the upper layer and the lower layer of the front resin sheet (2) was replaced with the resin composition (103UD), that the resin composition of the lower layer was replaced with the resin composition (103LF) and that the running speed of the base paper was set as shown in Table 22. Table 22 shows the results.

EXAMPLES 131–133

Example 118 was repeated except that the running speed of the base paper was set as shown in Table 22. Table 22 shows the results.

TABLE 22

|  | Running speed of base paper (m/minute) | Peeling property | Gloss appearance |
|---|---|---|---|
| Example 128 | 200 | 7 | ○-□ |
| Example 129 | 250 | 6 | □ |

TABLE 22-continued

| | Running speed of base paper (m/minute) | Peeling property | Gloss appearance |
|---|---|---|---|
| Example 130 | 300 | 5 | Δ |
| Example 131 | 200 | 9 | ⊙ |
| Example 132 | 250 | 8 | ⊙ |
| Example 133 | 300 | 7 | ⊙ |

The results in Table 22, i.e., the comparison between Example 128 and Example 131 (the running speed of the base paper was 200 m/minute), the comparison between Example 129 and Example 132 (the running speed of the base paper was 250 m/minute), and the comparison between Example 130 and Example 133 (the running speed of the base paper was 300 m/minute) show the following. With an increase in the running speed of the base paper (i.e., with an increase in the speed of production of the support for an imaging material), that is, when the running speed of the base paper is at least 200 m/minute, further, at least 250 m/minute, particularly, at least 300 m/minute, of the supports of the present invention, the support of which the front resin sheet is constituted to have a multi-layered structure by a consecutive melt extrusion coating method is particularly preferred in view of the effects on improvements in the gloss appearance of a photographic print and the property of peeling. Further, the above support for an imaging material can give an imaging material and a print thereon which have a high gloss appearance, and it is an excellent support for an imaging material, which support is free from the occurrence of peeling non-uniformity and can be stably produced at a high speed.

EXAMPLE 134

The following ink receiving layer was formed on the support obtained in Example 104 in place of the multi-layered silver halide color photograph constituting layer, to prepare an inkjet recording material. As a result, the inkjet recording material had a high-gloss appearance and was free of non-uniformity in gloss, and the above support was therefore excellent.

The ink receiving layer was formed by applying a coating solution containing 30 g of an aqueous solution containing 10% by weight of an alkali-treated gelatin having a molecular weight of 70,000, 37.5 g of an aqueous solution containing 8% by weight of sodium carboxymethyl cellulose (etherification degree 0.7–0.8, viscosity of 2 wt % aqueous solution measured with Brookfield viscometer 5 cp or less), 0.3 g of a methanol solution containing 5% by weight of an epoxy compound (NER-010, supplied by Nagase Sangyo K. K.), 0.5 g of a methanol/water mixture containing 5% by weight of 2-ethylhexyl sulfosuccinate and 31.7 g of purified water, and the ink receiving layer had a solid content of 7 g/cm$^2$.

EXAMPLES 135–140 AND COMPARATIVE EXAMPLES 34–37

A broad-leaved bleached kraft pulp was beaten so as to have a fiber length of 0.56 mm, 0.62 mm or 0.68 mm (in terms of JAPAN TAPPI Paper Pulp Testing Method No. 52-89, "Method of testing paper and pulp for fiber length"). Then, to 100 parts by weight of the beaten pulp were added 3 parts by weight of cationized starch, 0.2 part by weight of anionized polyacrylamide, 0.4 part by weight (as a ketene dimer content) of an alkylketene dimer emulsion, 0.4 part by weight of a polyamide epichlorohydrin resin, 1.5 parts by weight of an amphoteric polyacrylamide and proper amounts of a fluorescent brightener, a blue dye and a red dye, to prepare paper material slurries. Then, the paper material slurries were placed on a Fourdriner paper machine running at a speed of 200 m/minute to form a web with applying proper turbulence. In a wet part, the web was subjected to three-stage wet press at a linear pressure adjusted in the range of 15 to 100 kgf/cm. Then, the web was treated with a smoothing roll. In a subsequent drying part, the web was subjected to twp-stage bulk density increasing press at a linear pressure adjusted in the range of 30 to 70 kgf/cm and then dried. Then, during the drying, a size press solution containing 4 parts by weight of carboxy-modified polyvinyl alcohol, 0.05 part by weight of a fluorescent brightener, 0.002 part by weight of a blue dye, 4 parts by weight of sodium chloride and 92 parts by weight of water was size-pressed at a speed of 25 g/cm$^2$, and the web was dried such that the base paper to be finally obtained had a water content of 8% by weight in terms of an absolute dry water content. The web was machine-calendered at a linear pressure of 70 to 100 kgf/cm to obtain a base paper for a support for an imaging material, the base paper having a basis weight of 170 g/m$^2$. In addition, the base paper from the pulp having a fiber length of 0.56 mm had a density of 1.08 g/cm$^3$ and a central plane average roughness SRa of 1.20 μm, the base paper from the pulp having a fiber length of 0.62 mm had a density of 1.05 g/cm$^3$ and a central plane average roughness SRa of 1.37 μm, and the base paper from the pulp having a fiber length of 0.68 mm had a density of 1.02 g/cm$^3$ and a central plane average roughness SRa of 1.55 μm.

Then, the base paper surface (reverse surface) opposite to the surface where an image-forming layer was to be formed was subjected to corona discharge treatment, and then, a compounded resin composition containing 30 parts by weight of a low-density polyethylene resin (density 0.924 g/cm$^3$, MFR=1 g/10 minutes) and 70 parts by weight of a high-density polyethylene resin (density 0.967 g/cm$^3$, MFR=15 g/10 minutes) was coated on the reverse surface to form a resin layer having a thickness of 25 μm with a melt extrusion applicator at a resin temperature of 320° C. at a base paper running speed of 200 m/minute at a linear pressure of 40 kgf/cm in a cooling roll and a press roll. In this case, the used cooling roll had been surface-roughened by a liquid honing method, and was operated at a cooling water temperature of 12° C. Thereafter, a front resin sheet was formed as follows, to produce a resin-coated paper.

The base paper surface (front surface) where a silver halide photograph constituting layer was to be formed was subjected to corona discharge treatment. Then, the following compounded composition (BL-1) or (BL-3) as a composition for a lower layer and the following compounded composition (BL-1), (BL-2), (BL-3), (BL-4) or (BL-5) as a composition for an upper layer were coated on the above surface in a combination as shown in Table 23 by two-layer co-extrusion coating with a two-layer co-extruder at a resin temperature of 315° C. at a base paper running speed of 200 m/minute at a linear pressure of 40 kgf/cm in a cooling roll and a press roll, to form a lower layer having a thickness of 21 μm and an upper layer having a thickness of 5 μm. The above cooling roll had a finely roughened surface plated with chromium and was operated at a cooling water temperature of 12° C. Further, the above melt extrusion coatings of the front surface and the reverse surfaces with the resin compositions were carried out by a so-called tandem method in which the consecutive extrusion coatings were carried out.

Compounded composition (BL-1): Compounded composition prepared by simply and fully mixing (dry-blending) 17 parts by weight of pellets of the following master batch (MB-1W) containing a titanium dioxide pigment, 8 parts by weight of pellets of the following master batch (MB-1B) containing a titanium dioxide pigment and Ultramarine and 75 parts by weight of pellets of the following low-density polythylene resin (S1).

Master batch (MB-1W): Master batch prepared by fully kneading 50% by weight of an anatase type titanium dioxide pigment which was surface-treated with hydrous aluminum oxide (0.50% by weight as an $Al_2O_3$ content based on the titanium dioxide and milled with a steam mill and had a particle number-average diameter, measured through an electron microscope, of 0.120 μm, 47.5% by weight of the following low-density polyethylene resin (S-2) and 2.5% by weight of zinc stearate in the presence of 240 ppm of 1,3,5-tris(4-tert-butyl-3-hydroxy-2,4-dimethyl-benzyl) cyanurate as an antioxidant with a Banbury mixer at 150° C., cooling the kneaded mixture and pelletizing it.

Master batch (MB-1B): Master batch prepared by fully kneading 50% by weight of the same titanium dioxide pigment as the above titanium dioxide pigment, 46.25% by weight of the following low-density polyethylene resin (S-2), 1.25% by weight of Ultramarine and 2.5% by weight of stearin-incorporated zinc in the presence of the same antioxidant as the above antioxidant with a Banbury mixer at 150° C., cooling the kneaded mixture and pelletizing it.

Low-density polyethylene resin (S-1): Autoclave-method high-pressure-process low-density polyethylene resin having a density of 0.918 $g/cm^3$ and an MFR of 4.0 g/10 minutes.

Low-density polyethylene resin (S-2): Tubular-method high-pressure-process low-density polyethylene resin having a density of 0.918 $g/cm^3$ and an MFR of 9.1 g/10 minutes.

Compounded composition (BL-2): Compounded composition prepared by simply and fully mixing (dry-blending) 17 parts by weight of pellets of the same master batch as the above master batch (MB-1W) containing a titanium dioxide pigment, 8 parts by weight of pellets of the same master batch as the above master batch (MB-1B) containing a titanium dioxide pigment and Ultramarine, 43.8 parts by weight of pellets of the same low-density polyethylene resin as the above low-density polyethylene resin (S-1) and 31.2 parts by weight of the following high-density polyethylene resin (S-3).

High-density polyethylene resin (S-3): Ziegler-method high-density polyethylene resin having a density of 0.967 $g/cm^3$ and an MFR of 6.8 g/10 minutes.

Compounded composition (BL-3): Compounded composition prepared by simply and fully mixing (dry-blending) 17 parts by weight of pellets of the same master batch as the above master batch (MB-1W) containing a titanium dioxide pigment, 8 parts by weight of pellets of the same master batch as the above master batch (MB-1B) containing a titanium dioxide pigment and Ultramarine, 31.6 parts by weight of pellets of the same low-density polyethylene resin as the above low-density polyethylene resin (S-1) and 43.4 parts by weight of pellets of the same high-density polyethylene resin as the above high-density polyethylene resin (S-3).

Compounded composition (BL-4): Compounded composition prepared by simply and fully mixing (dry-blending) 17 parts by weight of pellets of the same master batch as the above master batch (MB-1W) containing a titanium dioxide pigment, 8 parts by weight of pellets of the same master batch as the above master batch (MB-1B) containing a titanium dioxide pigment and Ultramarine, 22.9 parts by weight of pellets of the same low-density polyethylene resin as the above low-density polyethylene resin (S-1) and 52.1 parts by weight of pellets of the same high-density polyethylene resin as the above high-density polyethylene resin (S-3).

Compounded composition (BL-5): Compounded composition prepared by simply and fully mixing (dry-blending) 17 parts by weight of pellets of the same master batch as the above master batch (MB-1W) containing a titanium dioxide pigment, 8 parts by weight of pellets of the same master batch as the above master batch (MB-1B) containing a titanium dioxide pigment and Ultramarine, 14.3 parts by weight of pellets of the same low-density polyethylene resin as the above low-density polyethylene resin (S-1) and 60.7 parts by weight of pellets of the same high-density polyethylene resin as the above high-density polyethylene resin (S-3).

Further, after the front and reverse resin sheets were formed and before the resin-coated paper was taken up, the reverse resin sheet of the resin-coated paper was subjected to corona discharge treatment, and then the following back layer coating liquid was applied on machine. That is, a back layer coating liquid containing colloidal silica:styrene-based latex=1:1 and further containing sodium polystyrene-sulfonate and a proper amount of a coating aid was applied so as to form a back layer having a sodium polystyrene-sulfonate content of 0.021 $g/m^2$ as a dry weight and a latex content (as a solid content) of 0.21 $g/cm^2$ as a dry weight.

After the back layer was formed and before the resin-coated paper was taken up, the front resin sheet of the resin-coated paper was subjected to corona discharge treatment, an undercoating liquid containing 1.2 g of lime-treated gelatin, 0.3 g of low-molecular-weight gelatin (P-3226, supplied by Nitta Gelatin K. K.), 0.3 g of a methanol solution containing 10% by weight of butyl p-hydroxybenzoic acid and 0.45 g of a methanol/water mixture containing 5% by weight of 2-ethylhexyl sulfosuccinate, the total amount of the undercoating liquid being adjusted to 100 g by adding water, was uniformly applied on machine to form an undercoat layer having a gelatin application amount of 0.06 $g/m^2$, whereby a support for an imaging material was obtained.

The above-obtained support for an imaging material was evaluated for performances by the following methods.

A blue-sensitive emulsion layer containing a yellow color forming coupler was formed on the undercoat layer of the support, and an intermediate layer containing a color mixing preventer, a green-sensitive emulsion layer containing a magenta color forming coupler, an ultraviolet absorbent layer containing an ultraviolet absorbent, a red-sensitive emulsion layer containing a cyan color forming coupler and a protective layer were consecutively formed, with a multi-layer application E bar, to obtain a color printing paper having a total gelatin amount of 7 $g/m^2$. Each color-sensitive emulsion layer contained silver chlorobromide in an amount corresponding to 0.6 $g/m^2$ of silver nitrate, gelatin necessary for the formation and dispersion of silver halide and the formation of a film, proper amounts of a fogging preventer, a sensitizing dye, an application aid, a film curing agent and a thickener and a proper amount of a filter dye.

Then, the above-obtained color printing paper was stored at 35° C. under constant humidity for 5 days, a group picture (photograph of many people) was printed, subjected to development treatments such as development, bleaching, fixing and stabilization, and then dried to obtain a photographic print. Separately, print samples such as a set-solid white print (not exposed) and a set-solid black print (black color formed) were also prepared. A series of treatments for the exposure, the development and the drying were carried out with an automatic printer and an automatic developing machine. The color formation and development procedures were carried out in the order of color formation and development (45 seconds)→bleaching and fixing (45 seconds) →stabilization (90 seconds)→drying.

The so-obtained photographic prints of the universal photograph, the set-solid white print and the set-solid black print were totally evaluated for gloss appearance by 10 people as monitors. The ratings of evaluation of the gloss appearance are as follows (the larger the grade value is, the higher the gloss appearance is, and the smaller the grade value is, the lower the gloss appearance is).

Grades 10–9: The gloss appearance is remarkbly or considerably high.

Grades 8–6: The gloss appearance is high.

Grades 5–4: The gloss appearance is low to some extent, while the support is acceptable in practical use.

Grades 3–1: The gloss appearance is low, and there is a problem in practical use.

Further, the support for an imaging material was evaluated for curl resistance as follows. A photographic print having a size of 8.2 cm×11.7 cm was visually evaluated for a curled state at 20° C. at 40%RH by 10 people as monitors, and the curl resistance was determined on the basis of 10 grades. The ratings of evaluation of the curl resistance are as follows (the larger the grade value is, the higher the curl resistance is, and the smaller the grade value is, the lower the curl resistance is).

Grades 10–9: A support is slightly minus-curled (curled with a back layer inside) or is flat, and the curl resistance is remarkably excellent.

Grades 8–7: A support is slightly plus-curled (curled with an image-forming layer inside), while the curl resistance is excellent.

Grades 6–4: A support is plus-curled to such an extent that there is no problem in practical use.

Grades 3–1: A support is plus-curled extremely and there is a problem in practical use.

Table 23 shows the results.

TABLE 23

| Example (= Ex.), Comparative Example (= C Ex.) | Fiber length of natural pulp constituting base paper (mm) (Note 1) | Compounded composition for lower layer | Density of fiber in lower layer (g/cm$^3$) (Note 2) | Compounded composition for upper layer | Density of fiber in upper layer (g/cm$^3$,) (Note 2) |
|---|---|---|---|---|---|
| C Ex. 34 | 0.68 | BL-1 | 0.918 | BL-4 | 0.947 |
| Ex. 135 | 0.62 | BL-1 | 0.918 | BL-3 | 0.942 |
| Ex. 136 | 0.62 | BL-1 | 0.918 | BL-4 | 0.947 |
| Ex. 137 | 0.62 | BL-1 | 0.918 | BL-5 | 0.952 |
| C Ex. 35 | 0.56 | BL-1 | 0.918 | BL-1 | 0.918 |
| C Ex. 36 | 0.56 | BL-1 | 0.918 | BL-2 | 0.935 |
| Ex. 138 | 0.56 | BL-1 | 0.918 | BL-3 | 0.942 |
| Ex. 139 | 0.56 | BL-1 | 0.918 | BL-4 | 0.947 |
| Ex. 140 | 0.56 | BL-1 | 0.918 | BL-5 | 0.952 |
| C Ex. 37 | 0.56 | BL-3 | 0.942 | BL-4 | 0.947 |

TABLE 23-continued

| Example or Comparative Example | Gloss appearance of photographic print | Curl resistance |
|---|---|---|
| Comparative Example 34 | 1 | 10 |
| Example 135 | 5 | 10 |
| Example 136 | 6 | 10 |
| Example 137 | 7 | 9 |
| Comparative Example 35 | 2 | 10 |
| Comparative Example 36 | 3 | 10 |
| Example 138 | 6 | 10 |
| Example 139 | 10 | 10 |
| Example 140 | 10 | 9 |
| Comparative Example 37 | 10 | 3 |

Note 1: Pulp fiber length (mm) defined in the present specification and found by measuring natural pulp which was to constitute a base paper.
Note 2: Calculated density (g/cm$^3$) of total polyethylene resin components in a lower resin layer or an upper resin layer.

The results in Table 23 show the following. The support III for an imaging material, in which one surface of a base paper composed mainly of a natural pulp where an image-forming material is to be formed is coated with at least two resin layers, i.e., an upper layer (A) containing at least 50% by weight (as a content based on a total content of resin components contained in the upper layer) of a polyethylene resin and a lower layer (B) containing a largest amount (amount based on a total amount of resin components contained in the lower layer) of a polyethylene resin (b), the polyethylene resin (a) having a density of at least 0.940 g/cm$^3$, the polyethylene resin (b) having a density of less than 0.940 g/cm$^3$, the upper layer (A) having a thickness equivalent to, or smaller than, 50% of a total thickness of the resin layers, the base paper being composed mainly of a natural pulp having a fiber length in the range of 0.45 to 0.65 mm, i.e., the supports for imaging materials in Examples 135 to 140 are excellent supports which give photographic prints having a high gloss appearance and high curl resistance.

Of the supports III for imaging materials, provided by the present invention, in view of the effect on improvement in gloss appearance, the support having a base paper composed of a natural pulp having a fiber length of 0.48 to 0.62 mm is preferred, and the support having a base paper composed of a natural pulp having a fiber length of 0.50 to 0.59 mm is more preferred. Further, in view of the effect on improvement in the gloss appearance of a photographic print, the density of the total polyethylene resin components in the upper layer (A) is preferably at least 0.940 g/cm$^3$, and more preferably at least 0.945 g/cm$^3$, and particularly preferably at least 0.950 g/cm$^3$.

On the other hand, when the upper layer does not satisfy the requirements of the present invention (Comparative Examples 35 and 36), when the lower layer does not satisfy the requirements of the present invention (Comparative Example 37) or when the fiber length of the natural pulp constituting the base paper does not satisfy the requirement of the present invention, the support for an imaging material has problems in that it fails to give a photographic print having a high gloss appearance or has poor curl resistance.

EXAMPLES 141–144

Example 139 was repeated except that the resin composition for the upper layer was replaced with a compounded composition (BL-1) or one of the following compounded compositions (BL-6) to (BL-8).

Compounded composition (BL-6): Compounded composition prepared by simply and fully mixing (dry-blending) 17 parts by weight of pellets of the same master batch as the above master batch (MB-1W) containing a titanium dioxide pigment, 8 parts by weight of pellets of the same master batch as the above master batch (MB-1B) containing a titanium dioxide pigment and Ultramarine and 75 parts by weight of pellets of the following low-density polyethylene resin (S-4).

Low-density polyethylene resin (S-4): autoclave-method low-density polyethylene resin having a density of 0.924 g/cm$^3$ and an MFR of 4.0 g/10 minutes.

Compounded composition (BL-7): Compounded composition prepared by simply and fully mixing (dry-blending) 17 parts by weight of pellets of the following master batch (MB-2W) containing a titanium dioxide pigment, 8 parts by weight of pellets of the following master batch (MB-2B) containing a titanium dioxide pigment and Ultramarine and 75 parts by weight of pellets of the following low-density polyethylene resin (S-5).

Master batch (MB-2W): Master batch prepared in the same manner as in the preparation of master batch (MB-1W) except that the low-density polyethylene (S-2) was replaced with the following low-density polyethylene resin (S-6).

Master batch (MB-2B): Master batch prepared in the same manner as in the preparation of master batch (MB-1B) except that the low-density polyethylene (S-2) was replaced with the following low-density polyethylene resin (S-6).

Low-density polyethylene resin (S-5): Autoclave-method high-pressure-process low-density polyethylene resin having a density of 0.925 g/cm$^3$ and an MFR of 4.0 g/10 minutes.

Low-density polyethylene resin (S-6): Autoclave-method high-pressure-process low-density polyethylene resin having a density of 0.925 g/cm$^3$ and an MFR of 7.5 g/10 minutes.

Compounded composition (BL-8): Compounded composition prepared by simply and fully mixing (dry-blending) 17 parts by weight of pellets of the same master batch as the above master batch (MB-2W) containing a titanium dioxide pigment, 8 parts by weight of pellets of the same master batch as the above master batch (MB-2B) containing a titanium dioxide pigment and Ultramarine, 86.4 parts by weight of pellets of the same low-density polyethylene resin as the low-density polyethylene resin (S-5) and 8.6 parts by weight of the same high-density polyethylene resin as the high-density polyethylene resin (S-3).

Table 24 shows the results.

TABLE 24

| Example | Compounded composition for lower layer | Density of resin in lower layer (g/cm$^3$) Note. 2 | Gloss appearance of photographic print | Curl resistance |
|---|---|---|---|---|
| Example 141 | BL-1 | 0.918 | 10 | 10 |
| Example 142 | BL-6 | 0.923 | 10 | 9 |
| Example 143 | BL-7 | 0.925 | 10 | 8 |
| Example 144 | BL-8 | 0.929 | 10 | 6 |

Note 2: the same as Note 2 to Table 23.

The results in Table 24 show the following. The supports for an imaging material in the present invention (Examples 141 to 144) are excellent supports which can give photographic prints having a high gloss appearance and excellent curl resistance. In view of the curl resistance in particular, the supports in which the density (calculated density) of the total polyethylene resin components of the lower layer is 928 g/cm$^3$ or lower are more preferred, and the support in which the above density is 0.921 g/cm$^3$ or lower is particularly preferred.

EXAMPLES 145–148 AND COMPARATIVE EXAMPLE 38

Example 139 was repeated except that the resin composition (BL-1) for a lower layer and the resin composition (BL-4) for an upper layer were extruded by two-layer co-extrusion coating such that the thickness of the lower layer and the thickness of the upper layer were as shown in Table 25. Table 25 shows the results.

| | Thickness of lower layer ($\mu$m) | Thickness upper layer ($\mu$m) | Ratio of of thickness of upper layer (%) (Note 3) | Gloss appearance of photographic print | Curl resistance |
|---|---|---|---|---|---|
| C Ex. 38 | 13 | 18 | 58.1 | 10 | 3 |
| Ex. 145 | 17 | 14 | 45.2 | 10 | 6 |
| Ex. 146 | 21 | 10 | 32.3 | 10 | 8 |
| Ex. 147 | 24.8 | 6.2 | 20.0 | 10 | 10 |
| Ex. 148 | 21 | 5 | 16.1 | 10 | 10 |

Ex. = Example, C Ex. = Comparative Example
Note 3: The ratio of thickness of upper layer to the total resin layer thickness on the front side.

The results in Table 25 show the following. The supports for an imaging material (Examples 145 to 148) in the present invention in which the front surface of the base paper is coated with at least two resin layers and the thickness of the upper layer is equivalent to, or smaller than, 50% of the total thickness of the resin sheet formed of at least two layers are excellent supports which can give photographic prints having a high gloss appearance and excellent curl resistance. Further, in view of the curl resistance, the supports in which the thickness of the upper layer is equivalent to, or smaller than, 35% of the total thickness of the resin sheet formed of at least two layers are preferred, and the supports in which the thickness of the upper layer is equivalent to, or smaller than, 20% of the total thickness of the resin sheet formed of at least two layers are particularly preferred.

Further, the support for an imaging material (Comparative Example 38) in which the thickness of the upper layer is greater than 50% of the total thickness of the resin sheet formed of at least two layers and which is outside the scope of the present invention is poor in curl resistance and has a problem in this regard.

EXAMPLES 149–156 AND COMPARATIVE EXAMPLES 39–40

A base paper having a central plane average roughness SRa shown in Table 26 was prepared in the same manner as in Example 139 except that the pulp was replaced with a pulp which was beaten to have a fiber length shown in Table 26 and that the linear pressure of the machine calender was properly adjusted. The so-obtained base paper in each Example had a density of 1.02 to 1.10 g/cm$^3$. Example 139 was repeated except that the base paper used in Example 139 was replaced with the above base paper. Table 26 shows the results.

TABLE 26

| | Fiber length of natural pulp constituting base paper (mm) Note 1 | Central plane average roughness SRa (μm) | Gloss appearance of photographic print | Curl resistance | stiffness |
|---|---|---|---|---|---|
| C Ex. 39 | 0.42 | 1.01 | 10 | 8 | 3 |
| Ex. 149 | 0.45 | 1.03 | 10 | 9 | 5 |
| Ex. 150 | 0.48 | 1.05 | 10 | 10 | 7 |
| Ex. 151 | 0.50 | 1.08 | 10 | 10 | 8 |
| Ex. 152 | 0.53 | 1.13 | 10 | 10 | 9 |
| Ex. 153 | 0.56 | 1.20 | 10 | 10 | 10 |
| Ex. 154 | 0.59 | 1.30 | 10 | 10 | 10 |
| Ex. 155 | 0.62 | 1.37 | 6 | 10 | 10 |
| Ex. 156 | 0.64 | 1.45 | 4 | 10 | 10 |
| C Ex. 40 | 0.68 | 1.55 | 1 | 10 | 10 |

Ex. = Example, C Ex. = Comparative Example
Note 1: The same as Note 1 to Table 23.

The support for an imaging material was evaluated for stiffness as follows. A 13 cm×18 cm color photographic print prepared in the same manner as in Example 135 was evaluated by 10 people as monitors. The color photographic print was manually held and shaken up and down to evaluate the stiffness on the basis of manual feeling, and the stiffness was determined on the basis of 10 stages of grades. The ratings of evaluation of the stiffness (the greater the number of grade is, the higher the stiffness is, and the smaller the number of grade is, the lower the stiffness is) are as follows.

Grades 10–9: The stiffness is high.
Grades 8–7: The stiffness is high to some extent.
Grades 6–4: The stiffness is low to some extent, while the support is practically acceptable.
Grades 3–1: The stiffness is low, and there is a problem in practical use.

The results in Table 26 show the following. The supports for an imaging material in the present invention (Examples 149 to 156) are excellent supports which can give photographic prints having a high gloss appearance, excellent curl resistance and high stiffness. In particular, in view of effects on the improvements in the gloss appearance and the stiffness of a photographic print, the support in which the fiber length of the natural pulp is 0.48 to 0.62 mm is preferred, the support in which the fiber length of the natural pulp is 0.50 to 0.59 mm is more preferred, and the support in which the fiber length of the natural pulp is 0.53 to 0.59 mm is particularly preferred. Further, concerning the base paper for use in the present invention, the base paper having a central plane average roughness of 1.5 μm or less is preferred, the base paper having a central plane average roughness of 1.4 μm or less is more preferred, and the base paper having a central plane average roughness of 1.3 μm or less is particularly preferred.

On the other hand, the supports for an imaging material (Comparative Examples 39 and 40) outside the scope of the present invention fail to give a photographic print having high stiffness or fail to give a photographic print having a high gloss appearance, and thus have a problem.

EXAMPLES 157–159

Example 139 was repeated except that the running speed of the base paper was changed as shown in Table 27.

EXAMPLE 160

Example 139 was repeated except that the surface of the base paper, which had been subjected to corona discharge treatment, was coated with a lowermost layer, and then coated with an intermediate layer and an uppermost layer (concurrently), at a base paper running speed of 200 m/minute by consecutive melt extrusion coating in different stations with melt extruders at a linear pressure of 40 kgf/cm in a finely roughened roll and a press roll, in place of forming the front resin sheet in Example 139. In the consecutive melt extrusion coating in this case, as a resin composition for the lowermost layer, the compounded composition (BL-1) was melt-extruded at a resin temperature of 315° C. to form a layer having a thickness of 16 μm, and then, the compounded composition (BL-1) for an intermediate layer and the compounded composition (BL-4) for an uppermost layer were two-layer co-extruded at a resin temperature of 310° C. each to form the intermediate layer having a thickness of 9 μm and the uppermost layer having a thickness of 5 μm. In the resin layer constitution of this Example, the uppermost layer works as an upper layer referred to in the present specification and the intermediate layer and the lowermost layer work as a lower layer referred to in the present specification.

EXAMPLES 161–162

Example 160 was repeated except that the running speed of the base paper was changed as shown in Table 27.

Table 27 shows the results obtained in Examples 157 to 162.

TABLE 27

| | Running speed of base paper | Method of melt extrusion coating for lowermost layer and uppermost layer | Gloss appearance of photographic print | Curl resistance |
|---|---|---|---|---|
| Example 157 | 200 | Co-extrusion | 10 | 10 |
| Example 158 | 250 | " | 7 | 10 |
| Example 159 | 300 | " | 5 | 10 |
| Example 160 | 200 | Consecutive extrusion | 10 | 10 |
| Example 161 | 250 | Consecutive extrusion | 10 | 10 |
| Example 162 | 300 | Consecutive extrusion | 10 | 10 |

The comparison between of the results in Examples 158 and 161 (running speed of base paper 250 m/minute each) and the comparison of the results in Examples 159 and 162 (running speed of base paper 300 m/each) show the following. With an increase in the running speed of the base paper (i.e., the production speed of the support for an imaging material), that is, when the running speed of the base paper is at least 250 m/minute, particularly, at least 300 m/minute, of the supports of the present invention, the support of which the front resin sheet is constituted to have a multi-layered structure by a consecutive melt extrusion coating method is particularly preferred in view of effects on the improvements in the gloss appearance of a photographic print. Further, the above support for an imaging material is an excellent support which can give an imaging material and a print thereon which have a high gloss appearance, and which can be produced at a high speed.

What is claimed is:

1. A method of producing a resin-coated-paper-based support for an imaging material having the support and an image-forming layer, which support comprises a base paper made of a natural pulp as a main component and at least three resin layers coated on a side of the base paper where an image is to be formed, said at least three resin layers including a lowermost layer formed on the base paper, an intermediate layer formed on the lowermost layer and an uppermost layer formed on the intermediate layer, the method comprising coating at least one resin layer for the lowermost layer on the base paper by melt extrusion, and then coating resin layers for the intermediate layer and the uppermost layer on the lowermost layer by concurrent extrusion to form a multi-layered resin layer on the base paper, wherein the uppermost layer is coated at a temperature lower than a temperature at which the lowermost layer is coated and the support is reduced at a production rate or base paper running rate of at least 250 m/minute.

2. The method of claim 1, wherein the multi-layered resin layer has three layers consisting of the uppermost layer, the intermediate layer and the lowermost layer.

3. The method of claim 1, wherein polyethylene-based resin components forming layers positioned below the uppermost layer have average density of 0.928 g/cm$^3$ or less.

4. The method of claim 1, wherein the uppermost layer has a thickness that is 50% or less based on a total thickness of the multi-layered resin layer, and each of layers positioned below the uppermost layer contains a largest amount of a polyethylene-based resin having a density of less than 0.940 g/cm$^3$.

5. The method of claim 1, wherein the uppermost layer contains at least 50% by weight of a polyethylene-based resin having a density of at least 0.940 g/cm$^3$.

6. The method of claim 1, wherein the base paper is made of a natural pulp having an average fiber length of 0.3 to 0.8 mm as main component.

7. The method of claim 1, wherein the natural pulp is a broad-leaved tree pulp.

8. The method of claim 1, wherein the base paper has a surface on which the multi-layered resin layer is not formed and the surface is coated with a polyethylene-based resin.

* * * * *